United States Patent
Cardin

(10) Patent No.: US 10,928,364 B2
(45) Date of Patent: Feb. 23, 2021

(54) THERMAL DESORBER FOR GAS CHROMATOGRAPHY SAMPLE INTRODUCTION WITH IMPROVED COMPOUND RECOVERY AND ENHANCED MATRIX MANAGEMENT

(71) Applicant: Entech Instruments Inc., Simi Valley, CA (US)

(72) Inventor: Daniel B. Cardin, Simi Valley, CA (US)

(73) Assignee: Entech Instruments Inc., Simi Valley, CA (US)

( * ) Notice: Subject to any disclaimer, the term of this patent is extended or adjusted under 35 U.S.C. 154(b) by 317 days.

(21) Appl. No.: 15/954,504

(22) Filed: Apr. 16, 2018

(65) Prior Publication Data

US 2018/0299415 A1 Oct. 18, 2018

Related U.S. Application Data

(60) Provisional application No. 62/485,819, filed on Apr. 14, 2017.

(51) Int. Cl.
*G01N 30/54* (2006.01)
*G01N 30/60* (2006.01)
(Continued)

(52) U.S. Cl.
CPC ............. *G01N 30/54* (2013.01); *G01N 30/12* (2013.01); *G01N 30/468* (2013.01);
(Continued)

(58) Field of Classification Search
CPC ...... G01N 30/54; G01N 30/468; G01N 30/12; G01N 30/6017; G01N 30/461; G01N 2030/128; G01N 30/7206; G01N 2030/025
See application file for complete search history.

(56) References Cited

U.S. PATENT DOCUMENTS

| 3,807,217 A | 4/1974 | Wilkins et al. |
| 4,849,179 A | 7/1989 | Reinhardt et al. |

(Continued)

FOREIGN PATENT DOCUMENTS

| CN | 105158380 A | 12/2015 |
| DE | 199 60 631 C1 | 7/2001 |

(Continued)

OTHER PUBLICATIONS

Zhong, Q. et al. (Nov. 12, 2008). "Characterization of a high-performance portable GC with a chemiresistor array detector," Analyst, The Royal Society of Chemistry 2009, located at: http://pubs.rsc.org, 12 pages.

(Continued)

*Primary Examiner* — Herbert K Roberts
*Assistant Examiner* — John M Royston
(74) *Attorney, Agent, or Firm* — Kubota & Basol LLP

(57) ABSTRACT

A system to thermally desorb a sample into a multi-column GC or GCMS system that can use both the desorption system and GC system for optimizing injection rates, matrix management (e.g., water elimination), optimizing recovery of a specific range of chemicals, and system cleanup is described. Reversing the flow through a first column inside the GC can facilitate the elimination of excess, condensed water as well as heavy chemicals that could otherwise affect the operation and background of the GC. The elimination of flow through both the thermal desorber and a first column in the GC during sample preheat can accommodate the pre-expansion of the sample that could otherwise result in pre-release to the active carrier gas flow in other systems. Transfer lines and rotary valves can be avoided, improving system performance and longevity, with simple maintenance achieved by replacing a desorption liner and the first GC column.

19 Claims, 11 Drawing Sheets

(51) Int. Cl.
*G01N 30/46* (2006.01)
*G01N 30/12* (2006.01)
*G01N 30/72* (2006.01)
*G01N 30/02* (2006.01)

(52) U.S. Cl.
CPC ....... *G01N 30/6017* (2013.01); *G01N 30/461* (2013.01); *G01N 30/7206* (2013.01); *G01N 2030/025* (2013.01); *G01N 2030/128* (2013.01)

(56) References Cited

U.S. PATENT DOCUMENTS

| | | | |
|---|---|---|---|
| 5,970,804 A * | 10/1999 | Robbat, Jr. | ............ G01N 30/54 |
| 6,447,575 B2 | 9/2002 | Bremer et al. | |
| 8,303,694 B2 | 11/2012 | Tipler | |
| 9,696,285 B2 | 7/2017 | Duraffourg et al. | |
| 2013/0299688 A1* | 11/2013 | Balogh et al. | .......... H01J 49/16 |
| 2015/0013770 A1 | 1/2015 | Tipler | |
| 2018/0076013 A1* | 3/2018 | Brodie et al. | ...... H01H 49/0468 |

FOREIGN PATENT DOCUMENTS

| | | |
|---|---|---|
| EP | 0 245 642 A1 | 11/1987 |
| JP | 2-9864 U | 1/1990 |
| JP | 4-254756 A | 9/1992 |
| JP | 2001-194354 A | 7/2001 |
| JP | 4626616 B2 | 2/2011 |

OTHER PUBLICATIONS

Anonymous. (Jan. 1, 2001). "Using the PreVent system in time-saver mode with the AutoSystem XL Gas Chromatograph and the TurboMass Mass Spectrometer," Application Note, pp. 1-8, XP55106913, PerkinElmer Instruments, Retrieved from the Internet: URL:http://shop.perkinelmer.com/content/applicationnotes/apppreventxigasturbomass.pdf, retreived on Mar. 11, 2014, the whole document.

International Search Report dated Jul. 30, 2018, for PCT Application No. PCT/US2018/027838, filed Apr. 16, 2018, seven pages.

Ras, M. R. et al. (Mar. 1, 2009). "Sampling and preconcentration techniques for determination of volatile organic compounds in air samples," Trends in Analytical Chemistry, Elsevier, Amsterdam, NL, vol. 28, No. 3, pp. 347-361, XP025958427, ISSN: 0165-9936, DOI: 10.1016/J.TRAC.2008.10.009, retrieved on Oct. 29, 2008, the whole document.

\* cited by examiner

520 ↘

| | Preheating 530 | Desorption and Sample Preparation 540 | Analysis and Clean up 550 |
|---|---|---|---|
| V1 521 | Closed 531 | Open 541 | Open 551 |
| V2 522 | Open 532 | Closed 542 | Open 552 |
| V3 523 | Closed 533 | Closed 543 | Open 553 |
| V4 524 | Open 534 | Open 544 | Closed 554 |
| Desorption Device Temperature 525 | Heat to Desorption Temperature 535 | Desorption Temperature 545 | Desorption Temperature 555 |
| Columns 1 and 2 Temperature 526 | Starting Temperature 536 | Heat to Final Temperature 546 | Final Temperature 556 |

| | Desorption and Sample Preparation 640 | Analysis and Clean up 650 |
|---|---|---|
| V1 621 | Open 641 | Open 651 |
| V2 622 | Closed 642 | Closed 652 |
| V3 623 | Closed 643 | Open 653 |
| V4 624 | Open 644 | Closed 654 |
| Desorption Device Temperature 625 | Heat to Desorption Temperature 645 | Remain at Desorption Temperature 655 |
| Columns 1 and 2 Temperature 626 | Starting Temperature 646 | Heat to Final Temperature 656 |

| | Preheating 730 | Desorption and Sample Preparation 740 | Analysis and Clean up 750 |
|---|---|---|---|
| V1 721 | Closed 731 | Open 741 | Closed 751 |
| V2 722 | Open 732 | Closed 742 | Open 752 |
| V3 723 | Closed 733 | Closed 743 | Open 753 |
| V4 724 | Closed 734 | Open 744 | Closed 754 |
| Desorption Device Temperature 725 | Heat to Desorption Temperature 735 | Desorption Temperature 745 | Desorption Temperature 755 |
| Columns 1 and 2 Temperature 726 | Starting Temperature 736 | Starting Temperature 746 | Heat to Final Temperature 756 |

| | Preheating 830 | Desorption and Sample Preparation 840 | Analysis and Clean up 850 |
|---|---|---|---|
| V1 821 | Closed 831 | Open 841 | Open 851 |
| V2 822 | Open 832 | Closed 842 | Closed 852 |
| V3 823 | Closed 833 | Closed 843 | Open 853 |
| V4 824 | Closed 834 | Open 844 | Closed 854 |
| Desorption Device Temperature 825 | Heat to Desorption Temperature 835 | Desorption Temperature 845 | Desorption Temperature 855 |
| Columns 1 and 2 Temperature 826 | Starting Temperature 836 | Starting Temperature 846 | Heat to Final Temperature 856 |

FIG. 8B

THERMAL DESORBER FOR GAS CHROMATOGRAPHY SAMPLE INTRODUCTION WITH IMPROVED COMPOUND RECOVERY AND ENHANCED MATRIX MANAGEMENT

CROSS-REFERENCE TO RELATED APPLICATIONS

This application claims the benefit of U.S. Provisional Application No. 62/485,819, filed on Apr. 14, 2017, the entire disclosure of which is incorporated herein by reference in its entirety for all intended purposes.

FIELD OF THE DISCLOSURE

This relates to a chemical analysis system and a method of its use and, more particularly, to a chemical analysis system including a thermal desorption device and a method of its use in conjunction with techniques such as gas chromatography (GC) and gas chromatography-mass spectrometry (GCMS).

BACKGROUND

GC and GCMS are techniques of performing analysis of trace chemicals in a wide range of sample matrices. In some examples, these techniques can be used to study biological matrices such as breath, blood, and urine; to study trace chemicals in food, water, and air; to detect odors in foods, beverages, products, and water supplies; and/or to analyze pharmaceuticals dissolved in water. Prior to analysis, the sample can be prepared including desorbing and concentrating the sample while also managing water and matrix.

Some chemical analysis systems and methods can use a purge and trap technique to prepare a sample for analysis. Purge and trap systems can include a trap external to the chemical analysis device that desorbs and concentrates a sample to be analyzed. After desorption, the sample can be transferred through one or more transfer lines to the chemical analysis device. Although purge and trap techniques can be used to concentrate compounds of interest, in some examples, the transfer lines, rotary valves, and rotors of purge and trap systems can become contaminated by the sample, requiring a cleanup process that can take hours to days to complete. Therefore, there exists a need in the field of chemical analysis for a technique that concentrates and desorbs a sample while managing the matrix and water without the use of a remote trap, rotary valves, and transfer lines.

SUMMARY

This relates to a chemical analysis system and a method of its use and, more particularly, to a chemical analysis system including a thermal desorption device and a method of its use in conjunction with techniques such as gas chromatography (GC) and gas chromatography-mass spectrometry (GCMS). In some examples, the chemical analysis system can include a sample container, a desorption device, a thermal chamber housing a first column and a second column, a plurality of valves controlled by a controller, and a detector.

During sample preheating, the desorption device can be heated to a desorption temperature in the range of 80 to 400 (e.g., 80 to 120, 200 to 300, 120 to 300, 120 to 400, etc.) degrees Celsius while the columns are at a starting temperature in the range of 30 to 50 degrees Celsius. In some examples, during preheating, flow can be avoided through the sample container, the desorption device, and the first column while a carrier fluid can flow through the second column. One or more compounds of the sample (e.g., water vapor) can expand during preheating and enter the first column, where they can condense until the end of sample preheating. In this way, during sample preheating, pre-injection of the sample onto the second column can be avoided.

After preheating under no flow through the sample container and the first column, the sample can be quickly transferred through the first column to the second column once sample preparation and desorption flow is allowed to occur. The length of the first column can allow pressures and flows controlled by the chemical analysis device to stabilize, which can produce more accurate splitting of the sample at the first column and the second column junction, thereby greatly improving analytical consistency and performance.

After desorption of the sample, the thermal chamber can heat the first column and second column to a desorption temperature on the order of 200 to 300 degrees Celsius over time to elute the compounds from the columns. For example, eluting one or more sample compounds through the second column can cause chemical separation of the injected chemicals. The desorption can include a split transfer or a splitless transfer which can facilitate some or all of the sample to transfer from the sample container to the first column, some or all of the sample to transfer from the first column to the second column, and from the second column to the detector. In this way, a fraction of the sample reaches the detector in some examples, with the remainder of the sample being backflushed off of the first column to the first split valve coupled to the sample desorption device or out through a second split valve coupled to the junction of the first column and the second column. During cleanup, one or more compounds not of interest that remain on the first column can be backflushed from the system and/or one or more compounds not of interest that remain in the sample container can be baked out from the system.

The systems and methods described herein can preheat and desorb one or more compounds of interest of the sample and substantially remove water and unwanted matrix from the system without allowing it to enter the second column or the detector. The sample can be rapidly transferred into the first column, reducing peak width and thus improving chromatographic resolving power of the system. Reducing water and removing unwanted heavy compound from the chemical analysis device before they can enter the second column and the detector can both reduce contamination of the second column and the detector, while preventing signal suppression in the detector and reducing cleanup times.

BRIEF DESCRIPTION OF THE DRAWINGS

FIGS. 5A-8B illustrate exemplary processes for performing chemical analysis and exemplary tables indicating the status of the valves, heater, and thermal chamber during the exemplary processes for performing chemical analysis according to examples of the disclosure.

DETAILED DESCRIPTION

Figure 1:
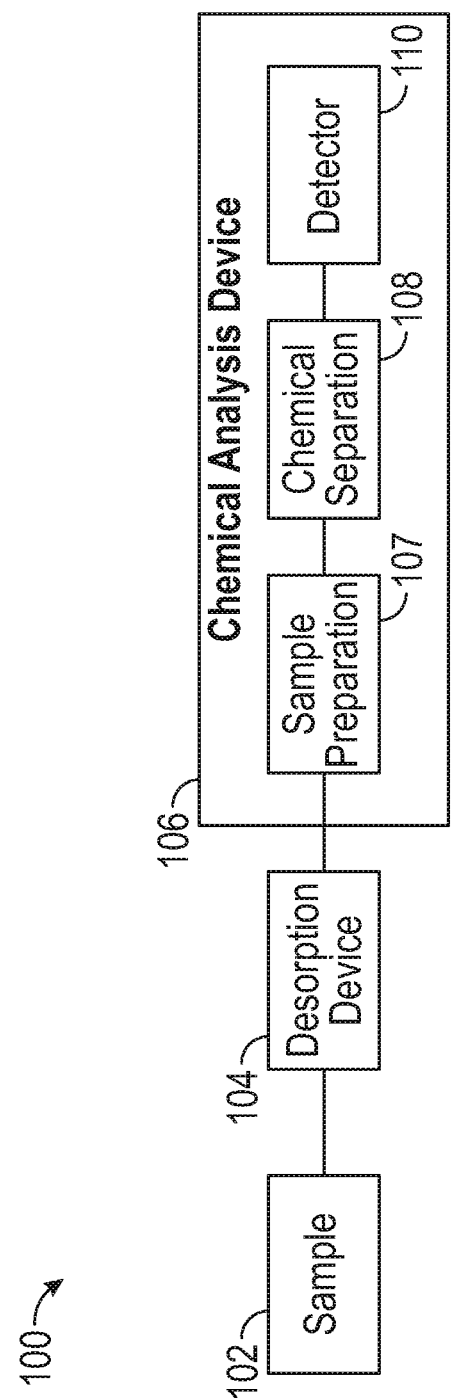
FIG. 1 illustrates an exemplary gas chromatography (GC) configuration according to examples of the disclosure.

In the following description, reference is made to the accompanying drawings which form a part hereof, and in which it is shown by way of illustration specific examples that can be practiced. It is to be understood that other examples can be used and structural changes can be made without departing from the scope of the examples of the disclosure.

This relates to a chemical analysis system and a method of its use and, more particularly, to a chemical analysis system including a thermal desorption device and a method of its use in conjunction with techniques such as gas chromatography (GC) and gas chromatography-mass spectrometry (GCMS). In some examples, the chemical analysis system can include a sample container, a desorption device, a thermal chamber housing a first column and a second column, a plurality of valves controlled by a controller, and a detector.

During sample preheating, the desorption device can be heated to a desorption temperature in the range of 80 to 400 (e.g., 80 to 120, 200 to 300, 120 to 300, 120 to 400, etc.) degrees Celsius while the columns are at a starting temperature in the range of 30 to 50 degrees Celsius. In some examples, during preheating, flow can be avoided through the sample container, the desorption device, and the first column while a carrier fluid can flow through the second column. One or more compounds of the sample (e.g., water vapor) can expand during preheating and enter the first column, where they can condense until the end of sample preheating. In this way, during sample preheating, pre-injection of the sample onto the second column can be avoided.

After preheating under no flow through the sample container and the first column, the sample can be quickly transferred through the first column to the second column once sample preparation and desorption flow is allowed to occur. The length of the first column can allow pressures and flows controlled by the chemical analysis device to stabilize, which can produce more accurate splitting of the sample at the first column and the second column junction, thereby greatly improving analytical consistency and performance.

After desorption of the sample, the thermal chamber can heat the first column and second column to a desorption temperature on the order of 200 to 300 degrees Celsius over time to elute the compounds from the columns. For example, eluting one or more sample compounds through the second column can cause chemical separation of the injected chemicals. The desorption can include a split transfer or a splitless transfer which can facilitate some or all of the sample to transfer from the sample container to the first column, some or all of the sample to transfer from the first column to the second column, and from the second column to the detector. In this way, a fraction of the sample reaches the detector in some examples, with the remainder of the sample being backflushed off of the first column to the first split valve coupled to the sample desorption device or out through a second split valve coupled to the junction of the first column and the second column. During cleanup, one or more compounds not of interest that remain on the first column can be backflushed from the system and/or one or more compounds not of interest that remain in the sample container can be baked out from the system.

The systems and methods described herein can preheat and desorb one or more compounds of interest of the sample and substantially remove water and unwanted matrix from the system without allowing it to enter the second column or the detector. The sample can be rapidly transferred into the first column, reducing peak width and thus improving chromatographic resolving power of the system. Reducing water and removing unwanted heavy compound from the chemical analysis device before they can enter the second column and the detector can both reduce contamination of the second column and the detector, while preventing signal suppression in the detector and reducing cleanup times.

FIG. 1 illustrates an exemplary gas chromatography (GC) configuration 100 according to examples of the disclosure. Configuration 100 can be used to determine one or more compounds in a sample using gas chromatography (GC) or gas chromatography-mass spectrometry (GCMS), and can include sample 102, desorption device 104 and chemical analysis device 106, which can include sample preparation device 107, chemical separation device 108 and detector 110, all of which will now be described.

Sample 102 can correspond to the sample of interest on which GC or GCMS is going to be performed. In some examples, sample 102 can include a sorbent that has concentrated one or more chemicals from a gas phase sample collected by any appropriate means such as in one or more Tedlar bags, one or more vacuum assisted sorbent extraction (VASE) devices, one or more diffusive sample collection devices, one or more active sampling devices, or in one or more vacuum sampling stainless steel canisters as described in EPA Method TO15. Specifically, volatile and semi-volatile gas compounds retained by the sorbent can be a collection of chemicals in outdoor or indoor air, in process streams, in stack gas, landfill gas, bio-waste gas, breath samples, or in the headspace above liquid or solid samples. Headspace measurements could include the analysis of blood, urine, drinking and waste water, soils, consumer products, wood, plastics, composites, etc. Configuration 100 could additionally be used in the analysis of aromas, odors, and taints in foods and beverages (wine, beer, soft drinks) optionally collected through use of a sorbent. In some examples, sample 102 can include a material to be directly desorbed (e.g., to analyze one or more volatiles or semi-volatiles emanating from the material) to be, for example, analyzed at elevated temperatures. Direct desorption can be performed on plastics and other synthetics, consumer products (e.g., to detect contaminants or odors), products where high temperature aroma profiles are of interest (e.g., tobacco and other products) along with characterization of unpleasant odors or other compounds of interest, and other compounds. In some cases, regulated contaminants can also be detected and measured.

Sample 102, which can be held in a sample container, can enter desorption device 104 before being desorbed (e.g., thermally desorbed) into chemical analysis device 106. In some examples, the sample container can be fluidly coupled to the chemical analysis device 106 by way of the desorption device 104. During the desorption and sample preparation process, compounds of interest within the sample can be concentrated and unwanted compounds, such as water vapor and alcohol, among other compounds, can be partially or mostly removed from the system by the desorption device 104 through condensation, backflushing, and/or splitting prior to the chemical separation 108 stage. Exemplary details for desorption device 104 will be described with reference to FIGS. 3-8B.

Chemical analysis device 106 can perform chemical analysis on sample 102 after the sample is transferred from the desorption device 104 to, for example, determine the composition of sample 102. In some examples, chemical analysis device 106 can be a device that performs GC and/or GCMS on sample 102 to determine the composition of sample 102.

Chemical analysis device 106 can include one or more columns (e.g., two columns, or more than two columns). In some examples, the first column of two columns included in chemical analysis device 106 can be used for sample preparation 107, as will be described below with reference to FIGS. 3-8. Sample preparation 107 can include water management, matrix management, and optionally the concentration of one or more target compounds of the sample for subsequent splitless delivery from the first column to the second column (e.g., heavier compounds for trace analysis) for example. By using the first column of two columns to perform one or more of water management, focusing heavy compounds of interest, and backflushing excess water or heavy compounds not of interest, the chemical analysis device 106 (e.g., GC or GC-MS) can perform sample preparation 107. Performing sample preparation inside of the Chemical Analysis Device 106 can reduce the length of the flow path to the separation column relative to external sample preparation where cold junctions and plastic valve rotors can exist, thereby allowing the configuration to stay clean. This arrangement can reduce the length of the flow path of the sample, thereby allowing the configuration to stay clean, enjoy easier maintenance, and perform at a higher level for longer times compared to systems that perform sample preparation outside of the chemical analysis device 106.

In some examples, chemical analysis device 106 can couple sample preparation device 107 directly to a chemical detector 110 with no further separation of chemical compounds. In some examples, chemical analysis device 106 can further include chemical separation device 108 (e.g., the second column of two columns, or the second and more columns of more than two columns). Prepared sample 102 can pass through chemical separation 108, which can separate compounds within sample 102 based on their properties (e.g., mass, volatility, chemical affinity, etc.). In some examples, chemical separation device 108 can be one or more capillary columns that can include one or more adsorbents, and through which concentrated sample 102 can pass.

Finally, after separation in chemical separation device 108, the compounds within sample 102 can exit chemical separation device 108 and be detected by detector 110. Detector 110 can be any suitable detector for detecting the presence and/or identities of compounds exiting chemical separation device 108. For example, detector 110 can be a mass spectrometer (e.g., in a GCMS configuration). The detector can be, for example, a non-specific detector such as FID, PID, ECD (electron capture detector), PDD, ELCD, CLD, or FPD or a spectroscopy-based detector such as IR, UV, and VUV. In some examples, other detector types are possible. Different compounds within sample 102 can exit chemical separation device 108 at different times depending on one or more properties of the compounds (e.g., mass, volatility, chemical affinity, etc.) and one or more properties of chemical separation device 108 (e.g., capillary column inner diameter, the adsorbent in the capillary columns, etc.). Thus, configuration 100 can be used to perform chemical analysis on sample 102 (e.g., GC or GCMS) to determine the composition of sample 102.

The temperature of desorption device 104 is separately controllable from the temperature of one or more components of the chemical analysis device 106. For example, desorption device 104 includes or is thermally coupled to an isolated temperature controlled zone. That is to say, the temperature of the desorption device 104 can be controlled separately from the temperature of the chemical analysis device 106 (e.g., chemical separation 108 stage or one or more columns included in the chemical analysis device). A series of valves can control or restrict the flow of the sample and/or one or more carrier fluids from the desorption device 104 into the chemical analysis device 106.

Desorption device 104 can further include a replaceable liner, for example. In some examples, the replaceable liner includes material such as glass, fused silica, or stainless steel optionally coated with an inert material (e.g., silonite). The replaceable liner of the desorption device 104 provides a low-cost way of reducing contamination of the chemical analysis configuration 100. In some examples, replacing the desorption device 104 liner restores a clean sample path through desorption device 104 with virtually no disassembly and at relatively low cost. Additionally, one or more components of the chemical analysis device 106 (e.g., a column used in sample preparation 107) can be replaced to reduce contamination caused by build-up of compounds over time. In this way, replacing the column used for sample preparation 107 reduces the contamination that reaches the column for chemical separation 108.

Figure 2:
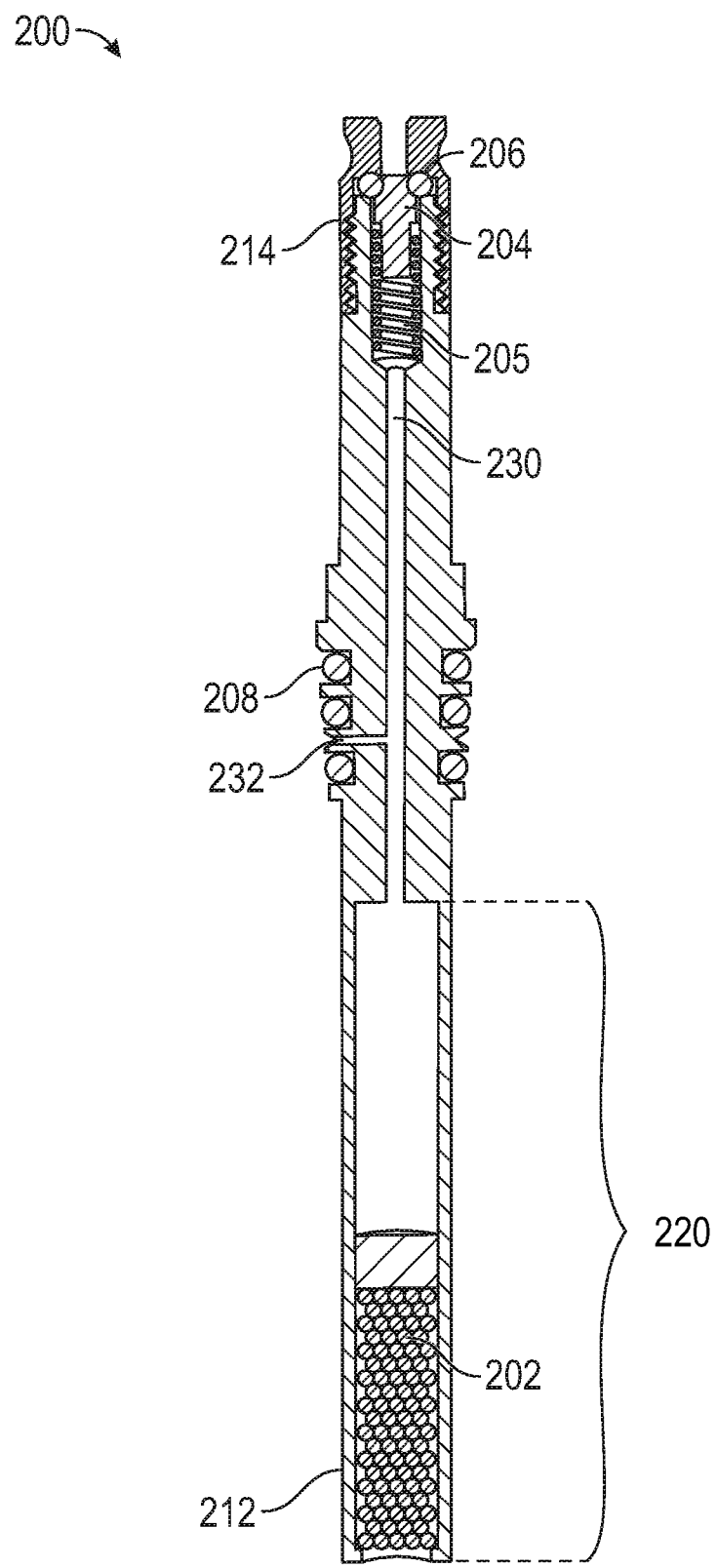
FIG. 2 illustrates an exemplary sample container according to examples of the disclosure.

FIG. 2 illustrates an exemplary sample container 200 according to examples of the disclosure. In some examples, sample container 200 can be used to provide sample 102 in configuration 100, as illustrated in FIG. 1. Other sample containers, such as 3.5" thermal desorption tubes, are possible without departing from the scope of the disclosure. As an example, sample container 200 can have a diameter between $\frac{1}{32}$ in. and $\frac{3}{8}$ in. (e.g., the external or internal diameter of the sample container). In some examples, other dimensions are possible. Sample container 200 can comprise a tube-like structure, for example, that includes various channels and/or cavities as will be described below. In some examples, sample container 200 can be fabricated from stainless steel or another suitable material (e.g., a material that is substantially inert). All or part of the surface of sample container 200 can be coated with a chemical vapor deposition (CVD)-deposited ceramic to increase the inertness of the sample container 200, for example. Other coatings that similarly increase the inertness of the sample container 200 can similarly be used.

Sample container 200 can include lower cavity 220. In some examples, the lower cavity 220 can contain a sorbent 202, which can be, for example, an adsorbent or an absorbent. The sorbent can be Tenax TA, Tenax/Carboxen, a short piece of 0.53 mm ID porous layer open tubular (PLOT) column ranging in composition from polydimethylsiloxane (PDMS), PLOT Q, and/or carboxen, or some other sorbent that can be chosen based on the sample(s) to be collected by the sample collection device 200, for example. As will be described below, in some examples, sorbent 202 can be selected to collect a sample for analysis. In some examples, the sorbent 202 can be located towards an extraction end 212 of the sample container 200. That is to say, sorbent 202 can be closer to the extraction end 212 of the sample container 200 than it is to a valve end 214 of the sample extraction device. Extraction end 212 of the sample container 200 can be open to the environment of the sample container such that the sample being collected can enter lower cavity 220, and can adsorb or absorb to sorbent 202, as will be described in more detail below. In some examples, lower cavity 220 can contain a material for which a thermal analysis is to be performed. In such examples, lower cavity 220 can be designed to be removed from the rest of container 200. In this way, lower cavity 220 can be filled, desorbed, and either refilled or disposed of after analysis.

At the valve end 214 of the sample container 200 (e.g., opposite extraction end 212 of the sample container 200), the sample container 200 can include a sealing plunger 204, a spring 205, and an internal seal 206, for example. The internal seal 206 can be a fluoroelastomer seal, a perfluoroelastomer seal, or any other suitable seal, for example. In some examples, sealing plunger 204 and internal seal 206 can selectively restrict fluid (e.g., gas, liquid, etc.) flow through internal channel 230 between sealing plunger 204/internal seal 206 and lower cavity 220/sorbent 202. For example, when sealing plunger 204 is pressed up against seal 206, fluid flow through sample container 200 can be restricted, and when sealing plunger 204 is moved away or otherwise separated from seal 206, fluid flow through sample container 200 may be unrestricted. In some examples, sealing plunger 204 can be tensioned via spring 205 against seal 206 such that in a default configuration, sealing plunger 204 can be pressed up against seal 206 and fluid flow through sample container 200 can be restricted. In some examples, spring 205 can be fabricated from a non-reactive material, such as 316 stainless steel coated with a ceramic material using a chemical vapor deposition (CVD) process. Fluid flow (e.g., air being drawn into a vacuum source or carrier fluid being allowed in by a pressurized container) through sample container 200 can be allowed by causing sealing plunger 204 to move away from seal 206 (e.g., via mechanical means such as a pin from above, or other means). For example, a vacuum source can be coupled to the sample extraction device 100 at the valve end 214 to open sealing plunger 204 and draw a vacuum through sealing plunger 204, an internal channel 230, and lower cavity 220. Additionally, in some examples, sealing plunger 204 can remain open (e.g., during continuous vacuum evacuation) to evaporate unwanted matrix, such as water or alcohol, from the sample through sorbent 202.

As an example, during a sample extraction process in which a sample can be collected in sample container 200, as will be described in more detail below, a vacuum can be drawn through sealing plunger 204, internal channel 230 and lower cavity 220 to facilitate sample collection by sorbent 202 in lower cavity 220. After the sample has been collected by the sample container 200, the sealing plunger 204 can be remain closed (e.g., as it can be during sample collection) and can isolate the sample from the environment, allowing the sample to be stored in the sample container 200 between extraction and analysis. For example, spring 205 can cause the sealing plunger 204 to remain closed in the absence of a mechanical force to open sealing plunger 204. During storage, the sample container 200 can be kept in an isolation sleeve to avoid contaminating the sample.

Subsequently, in some examples, during the chemical analysis process, a carrier fluid can be introduced through sealing plunger 204, into internal channel 230 and lower cavity 220, and into chemical analysis device 106, allowing for rapid desorption of the sample from sorbent 202 into the chemical analysis device 106, as will be described below with reference to FIGS. 3-8B. Additionally or alternatively, in some examples, during the chemical analysis process, the carrier fluid can be introduced through desorption port 232 (e.g., instead of through sealing plunger 204), into internal channel 230 and lower cavity 220, and into chemical analysis device 106.

In some examples, desorption port 232 can be in fluid communication with lower cavity 220 and the outside of sample container 200. Preferably, the open end of desorption port 232 can be located between external seals 208 so that port 232 is closed when the sample extraction device 100 is sealed against another object (e.g., a desorption device or sample vial), for example. In some examples, ports at other locations on sample container 200 are possible.

The sample container 200 can further include one or more external seals 208, for example. The external seals 208 can be made of an elastomeric material and can be fluoroelastomer seals or perfluoroelastomer seals. In some examples, the external seals 208 can be Viton™ seals or other suitable seals. The external seals 208 can be located externally on sample container 200 between ends 212 and 214. The external seals 208 can include one or more gaskets or o-rings fitted around the outside of the sample container 200, for example. In some examples, the external seals 208 can be used to form a seal between sample container 200 and a desorption device (e.g., desorption device 104) into which sample container 200 can be inserted during a sample desorption process.

Figure 3:
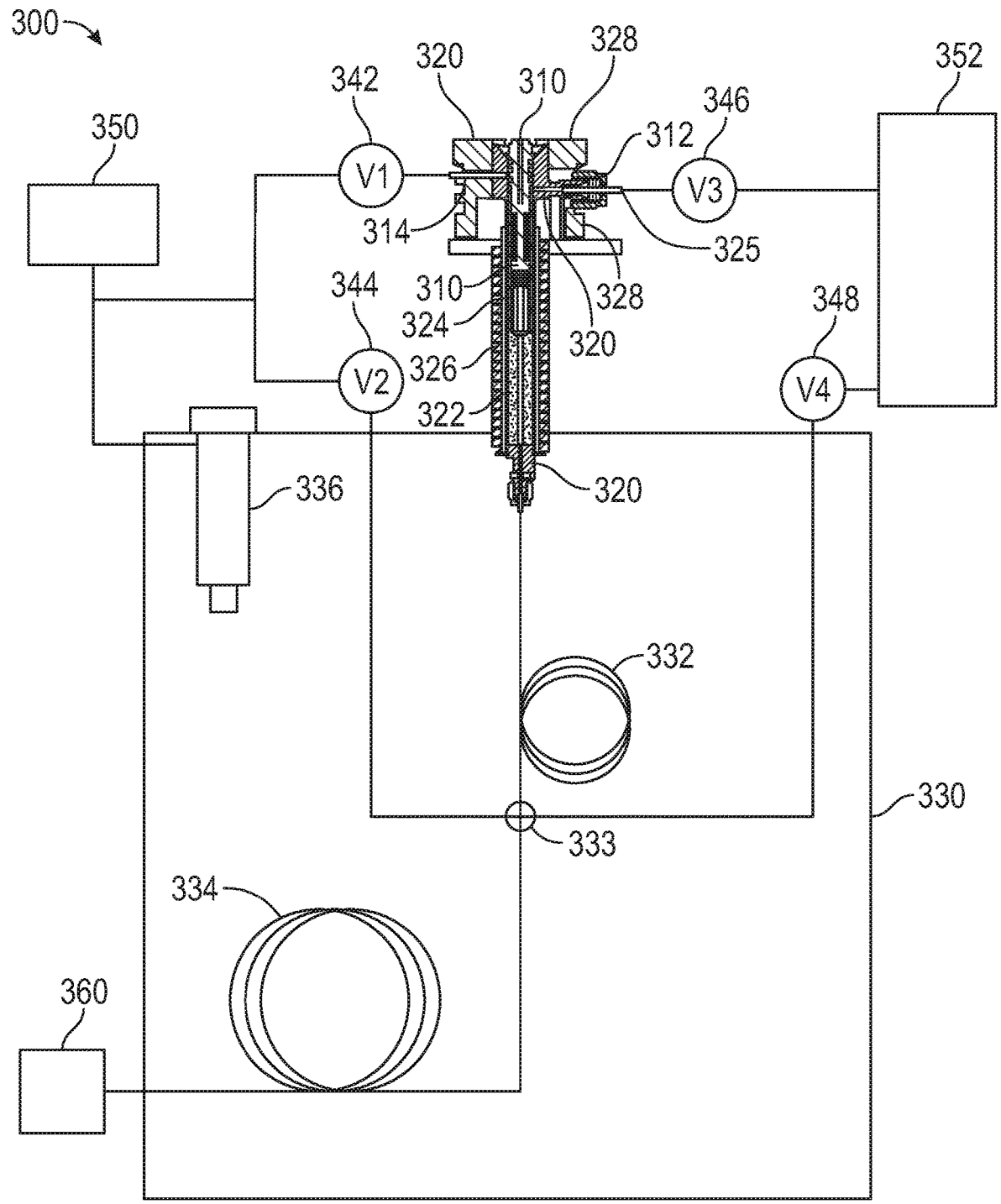
FIG. 3 illustrates an exemplary chemical analysis system according to examples of the disclosure.

FIG. 3 illustrates an exemplary chemical analysis system 300 according to examples of the disclosure. In some examples, chemical analysis system 300 includes sample container 310, desorption device 320, thermal chamber 330 (e.g., a temperature controlled oven for a gas chromatograph), a plurality of valves 342-348, pressure/flow controller 350, and detector 360. Chemical analysis system 300 can further include one or more processors (e.g., controllers, microprocessors, computers, computer systems, etc.) (not shown) running software and/or instructions housed on a non-transitory computer-readable medium for controlling the operation of one or more components of the chemical analysis system such as desorption device heater 326, thermal chamber 330, and valves 342-348.

Sample container 310 can correspond to sample container 200, for example. Other sample containers are possible. In some examples, sample container 310 can include seals 312 and desorption port 314. Sample container 310 can be used to extract, store, and transport a sample prior to analysis. Sample container 310 can further include one or more components of sample container 200 not shown in FIG. 3. During chemical analysis process, the sample container 310 can be coupled to the chemical analysis system by way of the desorption device 320. During a desorption and sample preparation process, one or more compounds of the sample can be released from a sorbent included in sample container 310 into the first column 332.

Desorption device 320 can include liner 322, optional conductive sleeve 324, split port 325, heater 326, and heat sink 328, for example. In some examples, liner 322 can include an inert or non-reactive material (e.g., glass or stainless steel). Optionally, liner 322 further includes an inert or non-reactive coating (e.g., silonite). Liner 322 can be removed and replaced, thereby removing compounds that can build up over multiple uses of chemical analysis system 300. In this way, chemical analysis system can be decontaminated by replacing liner 322. In some examples, heater 326 can include a coil heater surrounded by an insulating material, allowing the desorption device 320 to be thermally isolated and temperature-controlled. The sample container 310 can be thermally coupled to both the desorption device 320, including heater 326, for example. In this way, the heater can heat the sample container 310 when it heats the desorption device 320. Optionally, desorption device 320 can include a conductive sleeve 324 which can enable the sample container 310 to make improved thermal contact with heater 326. Conductive sleeve 324 can include a conductive material (e.g., aluminum or copper) and can be sized with an inner diameter that accommodates the sample container 310 and an outer diameter that can be accommodated by heater 326. In some examples, desorption device further includes heat sink 328. In some examples, the conductive sleeve 324 can be disposed inside the heater 326, a desorber tube can be disposed inside the conductive sleeve, the liner 322 can be disposed inside the desorber tube, and the sample container 310 can be disposed within the liner. In some examples, the desorber tube creates a pneumatic seal with the sample container 310, keeping the carrier fluid and sample contained for delivery into the chemical analysis device (e.g., first column 332, second column 334, and detector 360). The desorber tube can have a larger thickness in an upper portion attached to heat sink 328 than it does in a lower portion. The lower portion of the desorber tube, which can have a smaller thickness than the upper portion, can be in contact with optional conductive sleeve 324 or heater 326. The desorber tube can have a compression fitting on the bottom where the first column 332 can make a leak-tight connection. Split port 325 can create a channel connecting the delivery end (e.g., extraction end 212) of the sample container 310 (e.g., the end coupled to the first column 332) to the first split valve V3 346.

In some examples, thermal chamber 330 houses a first column 332 joined to a second column 334 at junction 333 and carrier fluid 336 (e.g., a carrier gas). In some examples, thermal chamber 330 can be a convection oven or another temperature-controlled container capable of heating the first column 332 and the second column 334. The temperature and operation of thermal chamber 330 can be controlled by one or more processors (e.g., controllers, microprocessors, computers, computer systems, etc.) operatively coupled to chemical analysis system 300 running one or more programs stored on a non-transitory computer-readable medium for operating the chemical analysis system. In a particular embodiment, thermal chamber 330 is a temperature-controlled oven for a gas chromatograph including first column 332 and second column 334. In some examples, thermal chamber 330 can include one or more vents that can be opened to reduce the temperature of thermal chamber 330 from a hot temperature (e.g., a temperature to cause one or more chemicals to elute from the first column 332 to the second column 334 and/or from the second column 334 to the detector 360) to a cooler temperature, as will be described below. Carrier fluid 336 can include an inert or non-reactive gas. Exemplary types of columns that can be used as the first column 332 include silonite-coated tubing and thin film capillary column, though other types of columns can be used. The first column 332 can be removed and replaced to discard one or more chemicals built up on the first column over time, thereby creating a new flow path for use in subsequent analyses.

The first column 332 can have an inner diameter in the range of 0.01-0.04 inches (0.25-1 mm), 0.02-0.04 inches (0.5-1 mm), 0.01-0.013 inches (0.25-0.33 mm), or 0.01-0.02 inches (0.25 to 0.53 mm), for example. The first column 332 can have a length in the range of 0.2 to 2 meters or up to 5 meters, for example. Other dimensions of the first column 332 are possible without departing from the scope of the disclosure. In some examples, the first column 332 can be removed and replaced to customize chemical analysis system 300 depending on the target compounds to be analyzed and/or to remove contaminants that have built up on the first column 332 after several uses. The volume of the first column 332 can be sufficient to accommodate the expansion of one or more compounds of a sample during sample preheating and/or desorption without allowing preloading of the compounds onto the second column 334, for example. In some examples, the volume of the first column 332 is sufficient to induce a delay between a time when flow is initiated though the first column 332 to the junction 333 and into the second column 334. This delay can, for example, provide time for the flow through the junction 333, the pressure at the junction, and a split ratio between flows going to the second column 334 and the second split valve V4 348 (if open) to stabilize (e.g., reach predetermined levels or levels within a threshold of predetermined levels) before the sample reaches the junction. That is to say, in some examples, when the sample reaches the junction 333, the flow rate is within a threshold of a predetermined flow rate, the pressure is within a threshold of a predetermined pressure, and the split ratio is within a threshold of a predetermined split ratio. Such consistency in pressure, flow, and split ratio can enable chemical analysis system 300 to perform reproducible analysis.

The second column 334 can have an inner diameter in the range of 0.007 to 0.013 inches (0.18-0.32 mm), such as an inner diameter of about 0.01 inches (0.25 mm), for example. The second column can have a length in the range of 15 to 30 meters or 30 to 60 meters. Other dimensions of the second column 334 are possible without departing from the scope of the disclosure. In some examples, thermal chamber 330 is a thermally-isolated temperature-controlled zone separate from the desorption device 320. That is to say, the temperature of thermal chamber 330 can be controlled to set the temperature of the first column 332 and the second column 334 separate from the temperature of the sample container within the desorption device 320.

The plurality of valves can include, for example, desorption valve V1 342, bypass valve V2 344, first split valve V3 346, and second split valve V4 348, for example. In some examples, the valves 342-348 can be controlled by one or more processors (e.g., controllers, microprocessors, computers, computer systems, etc.) operatively coupled to chemical analysis system 300 running one or more programs stored on a non-transitory computer-readable medium for operating the chemical analysis system. Desorption valve V1 342 can be fluidly coupled to sample container 310 by way of desorption port 314 and first split valve V3 346 can be fluidly coupled to sample container 310 via thermal desorber 320 at split port 325, for example. Bypass valve V2 344 can selectively divert (e.g., fluidly coupled and decouple) the supply of carrier fluid 336 at the outlet of the first column 332 at junction 333, for example. In some examples, when bypass valve V2 344 is open, compounds that have entered the first column 332 due to thermal expansion and/or diffusion from the sample container 310 (e.g., during pre-heat of sample container 310) remain on the first column 332, rather than entering the second column 334. Second split valve V4 348 can selectively divert (e.g., fluidly couple and decouple) some or most of the outlet of the first column 332 to a second split port out of the chemical analysis system 300 at junction 333 with the remainder of the flow going to the second column 334, for example. In some examples, the first split valve V3 346 and the second split valve V4 348 can be coupled to split control 352. Split control 352 can control, for example, the pressure and/or flow through the first split valve V3 346 and/or the second split valve V4 348. In some examples, one or more compounds included in the sample can exit the chemical analysis system 300 without substantially entering the second column 334 or the detector 360. The operation of valves 342-348 can be controlled by one or more controllers, processors, or computers operatively coupled to chemical analysis system 300. The timing of the operation of the valves 342-348 will be described below with reference to FIGS. 4-8B.

In some examples, chemical analysis can be performed at detector 360, which can correspond to detector 110 described with reference to FIG. 1. Detector 360 can perform GC, GC-MS, or other analysis techniques to determine the concentrations of one or more compounds included in a chemical sample.

Figure 4:
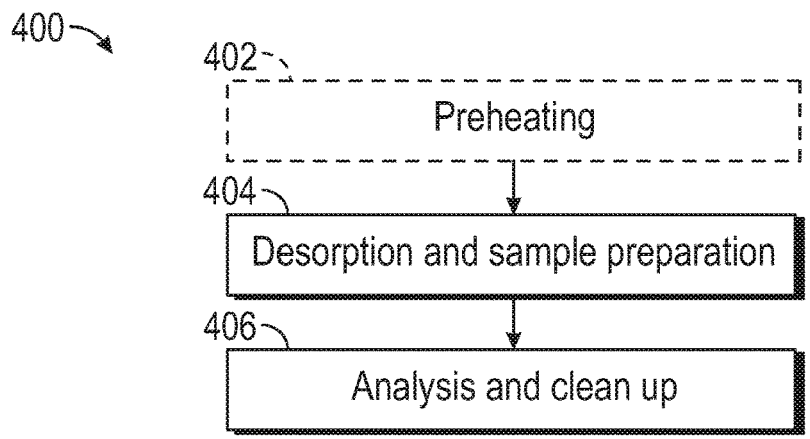
FIG. 4 illustrates an exemplary process of performing chemical analysis according to the examples of the disclosure.

FIG. 4 illustrates an exemplary process 400 of performing chemical analysis according to the examples of the disclosure. Process 400 includes the steps of optional preheating 402 of the sample, desorption and sample preparation 404, including desorption of the sample into the chemical analysis device, and analysis and clean up 406 following chemical analysis. Specific examples of performing process 400 are described with reference to FIGS. 5A-8B below. In some examples, one or more processors (e.g., controllers, microprocessors, computers, computer systems, etc.) running software and/or instructions stored on a non-transitory computer-readable medium for performing, initiating, controlling, or assisting in any of the steps in any of the processes described with reference to FIGS. 4-8B.

During optional preheating 402, the desorption device 320 can be heated from a starting temperature in the range of 30 to 70 degrees Celsius to a desorption temperature in the range of 80 to 400 (e.g., 80 to 120, 200 to 300, 120 to 300, 120 to 400, etc.) degrees Celsius while thermal chamber 330 (and thereby the first column 332 and the second column 334) is at a starting temperature in the range of 30 to 50 degrees Celsius. Heating the desorption device 320 in this way can heat the sample container 310, for example. In some examples, desorption device 320 can have an initial temperature as high as 150 degrees Celsius and the sample container 310 can have an initial temperature in the range of 25 to 35 degrees Celsius (i.e., room temperature). Other initial temperatures of the sample container 310 and the desorption device 320 are possible.

In some examples, bypass valve V2 344 and second split valve V4 348 can be open and the desorption valve V1 342 and the first split valve V3 346 can be closed during preheating 402. Such an arrangement can create a pressurized but zero flow condition in the sample container 310 and the first column 332. In this way, one or more compounds of the sample that may have expanded during preheating can enter the first column 332 without entering the second column 334. When these compounds enter the first column 332, they can re-condense due to the relatively low temperature of thermal chamber 330. That is to say, the volume of the first column 332 can accommodate expansion and, in some examples, some condensation of one or more compounds during sample preheat. Examples of the disclosure that can operate in this way during preheating are described below with reference to FIGS. 5A-B.

In some examples, bypass valve V2 344 can be open and the desorption valve V1 342, the first split valve V3 346, and the second split valve V4 348 can be closed during preheating 402. In this way, one or more compounds of the sample that may have expanded during preheating can enter the first column 332 without entering the second column 334. When these compounds enter the first column 332, they can re-condense due to the relatively low temperature of thermal chamber 330. That is to say, the volume of the first column 332 can accommodate expansion and condensation of one or more compounds during sample preheat. Examples of the disclosure that can operate in this way during preheating are described below with reference to FIGS. 7A-8B.

During desorption and sample preparation 404, the desorption device 320 can remain at the desorption temperature while thermal chamber 330 can remain at its starting temperature (e.g., 30 to 50 degrees Celsius). During desorption, one or more compounds can move from the sample container 310 to the first column 332, from the first column 332 to the second column, and/or from the second column 334 to the detector 360. Optionally, one or more of the first and second split valves V3 346 and V4 348 can be open during desorption and sample preparation 404, as will be described below.

In some examples, desorption valve V1 342 and second split valve V4 348 can be open and bypass valve V2 344 and first split valve V3 346 can be closed during desorption and sample preparation 404. In this way, one or more compounds in the sample can transfer from the sample container 310 to the first column 332, from the first column 332 to the second column 334, and from the second column 334 to the detector 360. Opening second split valve V4 348 during desorption and sample preparation 404 can allow a portion of the sample to exit the chemical analysis device 300 and increase the flow rate through the first column 332, which can, in turn, reduce the bandwidth of the compounds as they are transferred to the second column 334. For example, splitting the sample by opening the second split valve V4 348 can optimize loading onto the second column 334 by reducing the volume of the sample that is transferred to the second column 334 (e.g., container 310 can have a chemical capacity that is far greater than the chemical capacity of column 334; thus, it can be beneficial to reduce the amount of the sample that is ultimately transferred to the second column 334). Changing the flows by closing the bypass valve V2 344 and opening the desorption valve V1 342 and the second split valve V4 348 can disrupt the carrier fluid pressure momentarily until pressure controller 340 can re-establish the desired setpoint. However, the use of the first column 332 and the delay of the delay of the desorbed sample in reaching junction 333 between the first column and the second column 334 can allow stabilization of the pressure and subsequently accurate splitting between the second split valve V4 348 and the second column 334, thereby improving system reproducibility. Examples of the disclosure that operate in this way during sample preparation and desorption 404 are described below with reference to FIGS. 5A-8B. In this configuration, water vapor can remain condensed on the first column 332 at least during part of the desorption 404 process.

During analysis and cleanup 406, the first column 332 and the sample container 310 can be backflushed and/or baked out, which can remove remaining compounds not transferred into the second column 334 and/or to the detector 360. For example, one or more heavy compounds can remain on the first column 332 through desorption 404 and can be removed during cleanup 406. At this time, the thermal chamber 330 can heat the first column 332 and the second column 334 gradually over time to a final temperature in the range of 80 to 400 degrees Celsius or 200 to 300 degrees Celsius, for example. In some examples, the thermal chamber 330 can increase its temperature at a rate on the order of 6 degrees Celsius per minute. The final temperature of the thermal chamber 330 can be the same as or different from the desorption temperature of the desorption device 320.

In some examples, desorption valve V1 342, the bypass valve V2 344, and first split valve V3 346 can be open and the second bypass valve V4 348 can be closed during analysis and cleanup 406. This configuration causes the first column 332 to be backflushed, which can thereby remove excess condensed water or heavier compounds not of interest remaining on the first column 332. For example, water vapor and heavy compounds not of interest that can remain on the first column 332 can be removed from the chemical analysis system 300. Examples of the disclosure that can operate in this way during cleanup 406 are described below with reference to FIGS. 5A-6B.

In some examples, the desorption valve V1 342 and the second split valve V4 348 can be closed and the bypass valve V2 344 and the first split valve V3 346 can be open during analysis and cleanup 406. In this configuration, flow can continue through the second column 334 to elute compounds of interest into the detector 360 while the first column 332, which can contain compounds not of interest, can be backflushed out through the first split valve V3 346. Examples of the disclosure that can operate in this way during analysis and cleanup 406 are described below with reference to FIGS. 7A-7B.

In some examples, desorption valve V1 342 and first split valve V3 346 can be open and bypass valve V2 344 and second split valve V4 348 can be closed during analysis and cleanup 406. In this way, the sample container 310 can bake out while one or more compounds contained within the first column 332 can transfer to the second column 334. Examples of the disclosure that operate in this way during cleanup 406 are described below with reference to FIGS. 8A-8B.

Figure 5A:
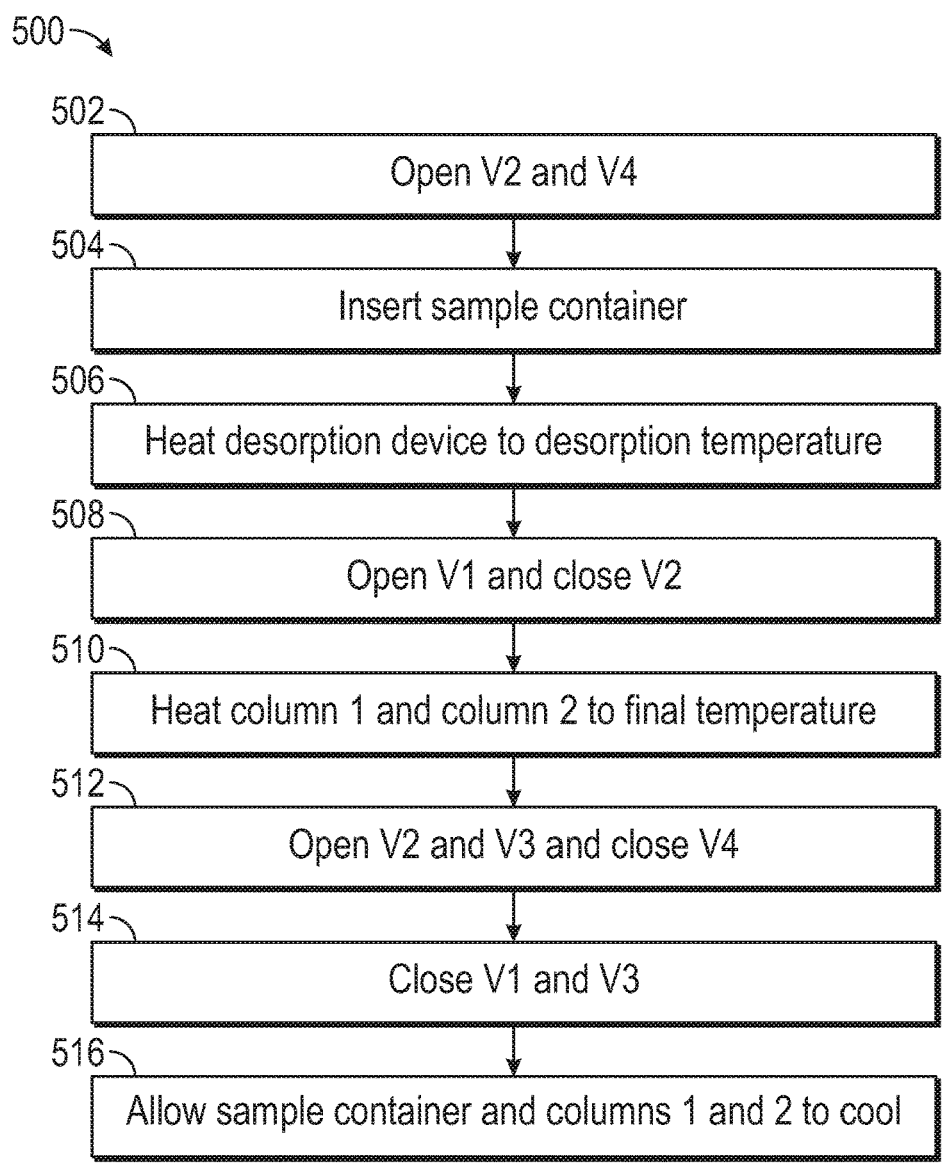

FIG. 5A illustrates an exemplary process 500 for performing chemical analysis according to some examples of the disclosure. Process 500 can be used in applications such as analyzing volatile compounds (e.g., volatile organic compounds or VOCs) within water samples extracted using vacuum-assisted sorbent extraction (VASE) or analyzing food and beverage samples extracted using VASE. Such compounds of interest can have boiling points in the range of −50 degrees Celsius to 230 degrees Celsius or as high as 400 degrees Celsius or higher, for example. In some examples, the concentration of one or more compounds of interest in the sample can be in the range of 0.5 to 100 parts per billion or 0.005 to 100 parts per billion.

Process 500 can be performed using a chemical analysis system such as configuration 100 or chemical analysis system 300. As an example, when performing process 500, the first column 332 can be silonite-coated tubing with an inner diameter in the range of 0.02 to 0.04 (0.5 to 1 mm) inches and a length in the range of 0.2 to 2 meters and the second column 334 can have a length in the range of 30 to 60 meters and an inner diameter in the range of 0.007 to 0.013 inches (0.18 to 0.32 mm). In some examples, other column types and dimensions are possible. In some examples, one or more processors (e.g., controllers, microprocessors, computers, computer systems, etc.) running software and/or instructions stored on a non-transitory computer-readable medium for performing, initiating, controlling, or assisting in any of the steps in process 500.

While the sample container 310 and the thermal chamber 330 are at respective starting temperatures, bypass valve V2 344 and second split valve V4 348 can be open (step 502 of process 500). In some examples, the starting temperature of the desorption device 320 can be in the range of 30 to 70 (e.g., 60 to 70) degrees Celsius and the starting temperature of the thermal chamber can be in the range of 30 to 50 (e.g., 35 to 50) degrees Celsius. Time can pass until the chemical analysis system 300 is ready to start the next analysis. In some examples, chemical analysis system 300 includes a GC or GC-MS that transmits a READY signal when it is ready to start the next analysis.

The sample container 310 can be inserted into the desorption device 320 (step 504 of process 500). In some examples, inserting the sample container 310 includes removing a sample container used in a previous analysis or a "blank" sample container. "Blank" sample containers do not include sorbent or sample but can be used in place of the previously-used sample container to close off the system 300 when a sample is not loaded.

The desorption device 320 can be heated to a desorption temperature (e.g., 80 to 400 or 200 to 300 degrees Celsius) using, for example, heater 326 (step 506 of process 500). Heating the desorption device 320 can take an amount of time on the order of one minute, for example. In some examples, heating the desorption device 320 can also heat the sample container 310. During this time, the first column 332 can remain at its starting temperature (e.g., in the range of 30 to 50 degrees Celsius), which can cause one or more compounds that expand within the sample container 310 to re-condense when they reach the first column.

The desorption valve V1 342 can be opened and the bypass valve V2 344 can be closed (step 508 of process 500). A carrier fluid 336 can flow through desorption valve V1 342 to flow through the sample container 310 to the first column 332, from the first column 332 to the second column 334, and from the second column 334 into the detector 360, with a portion of the sample exiting the chemical analysis system 300 through the second split valve V4 348. In some examples, performing a split transfer by opening the second split valve V4 348 can increase the flow rate of the sample through the first column, thereby improving chromatographic resolution. The split ratio of sample transfer can be in the range of 4:1 to 50:1 (e.g., 4:1 to 10:1) between the second column 334 and second split valve V4 348, for example. In this way, compounds can rapidly transfer from the first column 332 into the second column 334 while a portion of excess water and other matrix components can be removed. In some examples, the excess water and other matrix components can be mostly removed. Opening the second split valve V4 348 during desorption can reduce the delivery time of all compounds of interest to the second column 334, thereby reducing bandwidth and improving chromatographic resolution. For example, if the second split valve V4 348 were off and it were to take 6 cc of gas to completely desorb and transfer the compounds of interest to the second column 334, it would take 3 minutes at a typical second column flow rate of 2 cc per minute for the compounds to be delivered, causing very light compounds to have a broad bandwidth, be low in intensity, and unresolved from each other. By turning on a split flow (e.g., by opening the second split valve V4 348) at, for example, 30 cc per minute, a total flow volume of 6 cc through the desorption device 320 can be achieved in less than 12 seconds, thereby delivering the compounds onto the second column 344 in less than 12 seconds, allowing a narrower band of sample deposition and therefore a better opportunity for compounds to separate. While one or more compounds of interest of the sample can elute through the first column 332 to the second column 334, some or most of the water can remain condensed on the first column.

Once desorption of the sample from the sample container 310 is complete, the first column 332 and the second column 334 can begin to be heated over time to a final temperature (e.g., 80 to 400 or 200 to 300 degrees Celsius) using, for example, thermal chamber 330 (step 510 of process 500). In some examples, the thermal chamber 330 can be heated gradually at a rate around 6 degrees Celsius per minute. Heating the first column 332 and the second column 334 in this way can allow one or more compounds within the first and second columns to elute through the first column and second column towards the detector 360, while other compounds (e.g., water vapor and/or heavy compounds not of interest) can remain on the first column 332. Because the second split valve V4 348 can be open, flow rate through the first column 332 can be higher than flow rate through the second column 332, causing the bandwidth of compounds within the second column to be decreased. Elution of the sample into the detector 360 can be allowed to occur for an amount of time in the range of 3 to 60 (e.g., 3 to 6) minutes. The period of time over which the sample elutes into detector 360 can depend on a number of factors, such as the complexity of the sample and the temperature programming of the thermal chamber.

The bypass valve V2 344 and first split valve V3 346 can be opened and the second split valve V4 348 can be closed (step 512 of process 500) (e.g., after the portion of the sample transferred to second column 334 is detected by detector 360). The sample container 310 can bake out, allowing one or more compounds remaining in the sample container to exit the chemical analysis system 300, for example. During this time, the thermal chamber 330 can continue to be heated to its final temperature (e.g., for elution and cleanup of the first column 332). By opening the bypass valve V2 344, one or more compounds remaining on the first column 332 (e.g., water vapor and/or heavy compounds not of interest) at this time can be backflushed out through the first split valve V3 346 to exit the chemical analysis system 300 without entry into the second column 334 or the detector 360. Compounds of interest contained in the second column 334 can continue to move through the second column and elute into the detector 360.

The desorption valve V1 342 and the first split valve 346 can be closed (step 514 of process 500). In some examples, step 514 occurs after the bake out period is complete.

The desorption device 320, the first column 332, and the second column 334 can be allowed to cool (e.g., heater 326 can be powered off or deactivated and thermal chamber 330 can be deactivated and/or one or more vents of the thermal chamber can be opened) to their starting temperatures (step 516 of process 500). The starting temperature of the desorption device 320 can be in the range of 30 to 70 degrees Celsius and the starting temperature of the thermal chamber 330 can be in the range of 30 to 50 degrees Celsius, as described previously.

Accordingly, process 500 can desorb and elute one or more target compounds from the sample from the sample container 310, through the first column 332 and the second column 334, into the detector 360. Water vapor can condense on the first column 332 while the desorption device 320 is preheated, reducing its ability to continue expanding through the first column 332 into the second column 334. Splitting a portion of the sample out through the second split valve V4 348 and the first split valve V3 346 can reduce the amount of evaporated water vapor and heavier compounds not of interest that are allowed to enter the second column 334 (and eventually detector 360) during elution. Opening the second split valve V3 346 and the bypass valve V2 344 while the thermal chamber 330 is being heated to its desorption temperature even further allows water vapor and/or heavier compounds not of interest that remain on the first column to backflush out of the first column 332 through the first split valve V3 346 to exit the system without entering or, in some examples, contaminating, the second column 334 or the detector 360.

FIG. 5B illustrates an exemplary table 520 indicating the status of the valves 342-348, heater 326, and thermal chamber 330 during chemical analysis process 500 according to examples of the disclosure. Process 500 can include preheating 530 (e.g., preheating 402), desorption and sample preparation 540 (e.g., desorption and sample preparation 404), and analysis and cleanup 550 (e.g., analysis and cleanup 406). The operation of V1 521 (e.g., desorption valve V1 342), V2 522 (e.g., bypass valve V2 344), V3 523 (e.g., first split valve V3 346), and V4 524 (e.g., second split valve V4 348), the desorption device (e.g., desorption device 320) temperature 525 (e.g., controlled by heater 326), and columns 1 and 2 (e.g., first column 332 and second column 334) temperature 526 (e.g., controlled by thermal chamber 330) during preheating 530, desorption 540, and cleanup 550 of process 500 will now be described.

Preheating 530 can include steps 502-506 of process 500. In some examples, during preheating 530, V1 521 can be closed 531, V2 522 can be open 532, V3 523 can be closed 533, and V4 524 can be closed 534. The desorption device temperature 525 can be heated to the desorption temperature 535 (e.g., 80 to 400 or 200 to 300 degrees Celsius) and columns 1 and 2 temperature 526 can be a starting temperature 536 (e.g., 30 to 50 degrees Celsius), for example. In some examples, heating the desorption device 320 also heats a sample container 310 included in the desorption device.

Desorption and sample preparation 540 can include step 508 of process 500. In some examples, during desorption and sample preparation 540, V1 521 can be open 541, V2 522 can be closed 542, V3 523 can be closed 543, and V4 524 can be open 544. The sample container temperature 525 can remain at the desorption temperature 545 (e.g., 200 to 300 degrees Celsius) and columns 1 and 2 temperature 826 can remain at the starting temperature (e.g., 30 to 50 degrees Celsius).

Analysis and cleanup 550 can include steps 510-512 of process 500. In some examples, during analysis cleanup 550, V1 521 can be open 551, V2 522 can be open 552, V3 523 can be open 553, and V4 524 can be closed 554. The desorption device temperature 525 can remain at the desorption temperature 545 (e.g., 200 to 300 degrees Celsius). Columns 1 and 2 temperature 526 can begin to be heated to a final temperature 546 (e.g., 80 to 400 or 200 to 300 degrees Celsius) over time to elute the compounds of interest from the second column 334 to the detector 360, for example. In some examples, after the sample container 310 is baked out during cleanup 550, steps 514 and 516 of process 500 can be performed. During this time, chemical analysis is performed at the detector 360, for example.

Figure 6A:
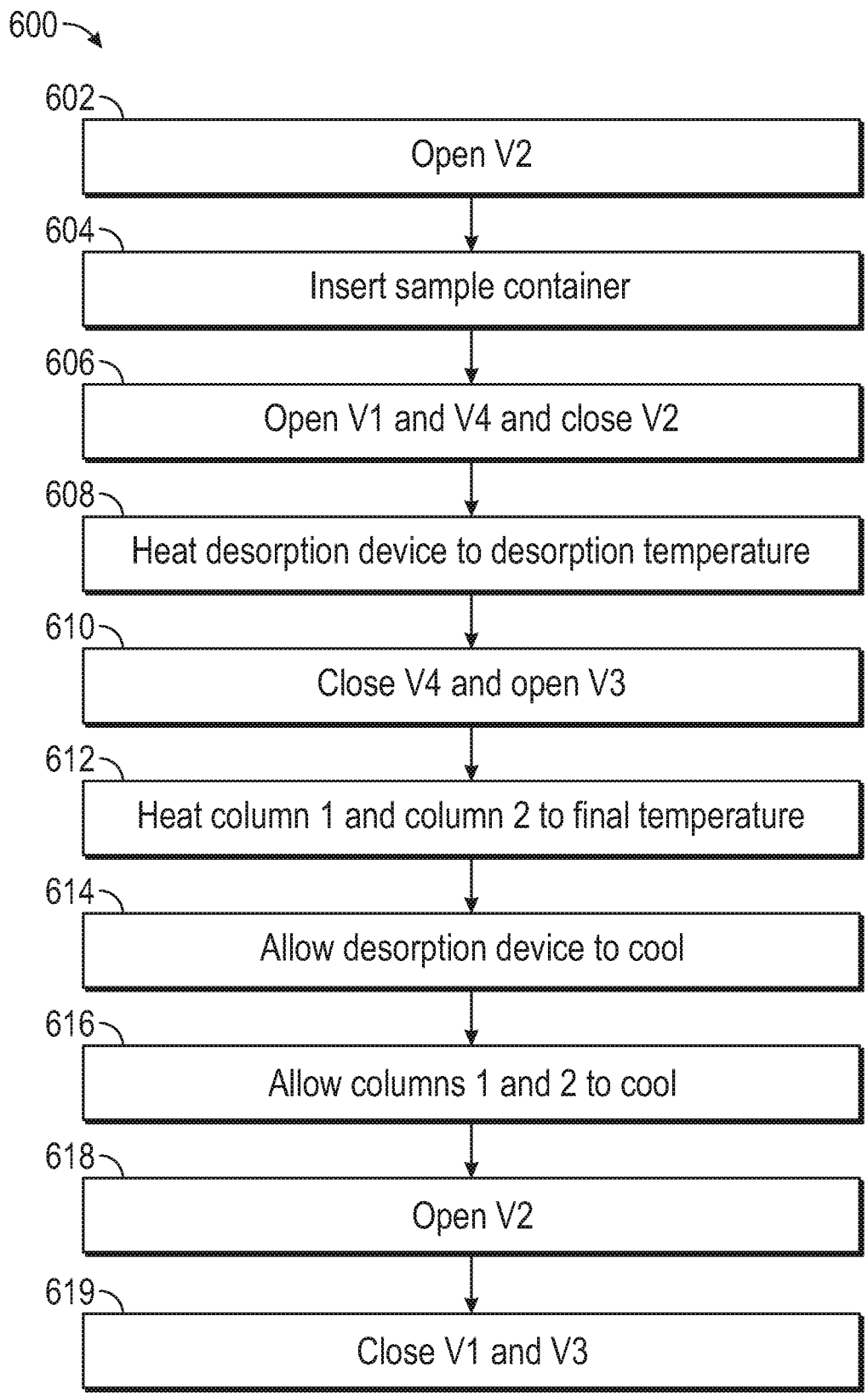

FIG. 6A illustrates an exemplary process 600 for performing chemical analysis according to some examples of the disclosure. Process 600 can be used in applications such as trace analysis of target compounds including heavy VOCs and SVOCs. In some examples, the concentration of one or more compounds of interest in the sample in the range of low to sub (e.g., 0.005-10) parts per billion.

Process 600 can be performed using a chemical analysis system such as configuration 100 or chemical analysis system 300. As an example, when performing process 600, the first column 332 can be have an inner diameter in the range of 0.01 to 0.021 (0.25 to 0.53 mm) inches and a length on the order of 5 meters and the second column 334 can have a length in the range of 30 to 60 meters and an inner diameter around 0.01 inches (0.25 mm). The first column 332 can include a film to absorb the sample that is somewhat thinner or weaker than a film on the second column 334. Such an arrangement can allow retention of the sample during desorption on the first column 332 while allowing a further "refocusing" of the sample as it passes from the less retentive first column 332 to the stronger more retentive second column 334, for example. In some examples, one or more processors (e.g., controllers, microprocessors, computers, computer systems, etc.) running software and/or instructions stored on a non-transitory computer-readable medium for performing, initiating, controlling, or assisting in any of the steps in process 600.

While the desorption device 320 and the thermal chamber 330 are at their starting temperatures, bypass valve V2 344 can be opened (step 602 of process 600). In some examples, the desorption device 320 can have a starting temperature in the range of 30 to 70 (e.g., 50 to 70) degrees Celsius and the thermal chamber 330 can have a starting temperature in the range of 30 to 50 degrees Celsius. Time can pass until the detector 360 is ready to start the next analysis.

The sample container 310 can be inserted into the desorption device 320 (step 604 of process 600). In some examples, inserting the sample container 310 includes removing a sample container used in a previous analysis or a "blank" sample container. "Blank" sample containers do not include sorbent or sample but can be used in place of the previously-used sample container to close off the system 300 when a sample is not loaded.

Desorption valve V1 342 and second split valve V4 348 can be opened and the bypass valve V2 344 can be closed (step 606 of process 600).

The desorption device 320 can be heated to a desorption temperature (e.g., 80 to 400 degrees Celsius) using, for example, heater 326 (step 608 of process 600). In some examples, heating the desorption device 320 in this way also heats the sample container 310 held within the desorption device. During this time, the first column 332 and second column 334 can remain at its starting temperature (e.g., 30 to 50 degrees Celsius), causing one or more compounds of the sample, such as the one or more compounds of interest (e.g., "heavy" VOCs and SVOCs), to become adsorbed or absorbed by the first column 332. In some examples, one or more compounds that enter the first column 332 can be removed from the chemical analysis system through the second split valve V4 338. For example, water vapor and one or more lighter compounds not of interest (e.g., one or more compounds with lower boiling points than those of the one or more target compounds) included in the sample can exit the chemical analysis system 300 through second split valve V4. Step 608 can last a period of time in the range of two to five minutes in some examples.

The second split valve V4 348 can be closed and the first split valve V3 346 can be opened (step 610 of process 600). One or more compounds contained in the sample container 310 can bake out of the system 300 through the first split valve V3 346.

The first column 332 and the second column 334 can be heated to a desorption temperature (e.g., 200 to 300 degrees Celsius) using, for example, thermal chamber 330 (step 612 of process 600). In some examples, the thermal chamber 330 can be heated gradually at a rate around 6 degrees Celsius per minute. Heating the first column 332 and the second column 334 in this way can allow one or more compounds (e.g., one or more "heavy" compounds of interest) within the first to elute to the second column and from the second column to the detector 360.

The desorption device 320 can be allowed to cool (e.g., heater 326 can be powered off or deactivated) to its starting temperature or close to its starting temperature (step 614 of process 600). In some examples, the desorption device 320 is cooled after clean up. Cooling the desorption device 320 in this way can also cool the sample container 310 held within the desorption device 320, for example.

The first column 332 and the second column 334 can be allowed to cool (e.g., thermal chamber 330 can be deactivated and/or one or more vents of the thermal chamber can be opened) to their starting temperature (step 616 of process 600). By cooling the first column and the second column, system 300 can be ready to start the next run at the proper starting temperatures, as described previously. That is to say, the sample container 310 can have a starting temperature in the range of 30 to 70 degrees Celsius and the first column 332 and the second column 334 can have a starting temperature in the range of 30 to 50 degrees Celsius.

The bypass valve V2 344 can be opened (step 618 of process 600). At this time, the second split valve V4 348 can be open or closed. Having the second split valve V4 open at this time can reduce flow rate fluctuation and achieve a more constant pressure transition between flow direction changes when the next sample is desorbed by opening the desorption valve V1 342 and the second split valve V4 348.

The desorption valve V1 342 and the first split valve V3 346 can be closed (step 619 of process 600). The valves can remain in this configuration when a new sample container 310 is inserted into the system 300 for analysis. At this time, the second split valve V4 348 can be open or closed. Having the second split valve V4 open at this time can reduce flow rate fluctuation and achieve a more constant pressure transition between flow direction changes when the next sample is desorbed by opening the desorption valve V1 342 and the second split valve V4 348.

FIG. 6B illustrates an exemplary table 620 indicating the status of the valves 342-348, heater 326, and thermal chamber 330 during chemical analysis process 600 according to examples of the disclosure. Process 600 can include desorption and sample preparation 640 (e.g., desorption and sample preparation 404) and analysis and cleanup 650 (e.g., analysis and cleanup 406). In some examples, process 600 does not require preheating. Rather, the desorption device 320 is heated during desorption and sample preparation 640. The operation of V1 621 (e.g., desorption valve V1 342), V2 622 (e.g., bypass valve V2 344), V3 623 (e.g., first split valve V3 346), and V4 624 (e.g., second split valve V4 348), the desorption device (e.g., desorption device 320) temperature 625 (e.g., controlled by heater 326), and columns 1 and 2 (e.g., first column 332 and second column 334) temperature 626 (e.g., controlled by thermal chamber 330) during desorption and sample preparation 640, and analysis and cleanup 650 of process 600 will now be described.

Desorption and sample preparation 640 can include steps 606-608 of process 600. In some examples, during desorption and sample preparation 640, V1 621 can be open 641, V2 622 can be closed 642, V3 523 can be closed 643, and V4 624 can be open 644. The desorption device temperature 625 can be heated to its desorption temperature 645 (e.g., 80 to 400 degrees Celsius). In some examples, heating the desorption device 320 can also heat a sample container 310 held within the desorption device.

Analysis and cleanup 650 can include step 612 of process 600. In some examples, during analysis cleanup 650, V1 621 can be open 651, V2 622 can be closed 652, V3 623 can be open 653, and V4 624 can be closed 654. The desorption device temperature 625 can remain at its desorption temperature (e.g., 80 to 400 or 200 to 300 degrees Celsius) 645. Columns 1 and 2 temperature 626 can be gradually heated to final temperature 646 (e.g., 200 to 300 degrees Celsius), for example. In some examples, after the sample container 310 is baked out during cleanup 650, steps 614-619 of process 600 can be performed. During this time, the detector 360 can perform chemical analysis on the sample.

Accordingly, process 600 can be used to detect chemicals that can be detected by the human nose at low to even sub-part per trillion levels with high (e.g., nearly 100%) recovery of the target compounds while also managing water. For example process 600 can be used where trace analysis of heavy VOCs through SVOCs are to be performed. During desorption and sample preparation 640, the one or more compounds of interest can be retained on the first column 332 while allowing carrier fluid (e.g., a carrier gas), water vapor, and lighter compounds not of interest to be split out from the second split valve V4 348 in high (e.g., 10:1 or 50:1) proportions. After the sample has transferred from the sample container 310 and the one or more compounds of interest are held on the first column 332, the thermal chamber 330 can be heated and the second split valve V4 348 can be closed to allow a large portion (e.g., nearly 100%) of the compounds of interest to elute from the first column 332 to the second column 334 and into the detector 360. The first split valve V3 can be opened during analysis and cleanup to bake out the sample container 310 so that it can be re-used. Examples of target compounds that can be analyzed in this way include chemicals with olfactory detection limits in the range of 0.1 to 50 part per trillion, including Geosmin and 2-MIB in drinking water, Trihaloanisoles in wine and water (e.g., Trichloroanisole, which is responsible for the "corking" in wine), and methyl Pyrazines in a variety of matrices. Other fragrances and odors may require low detection limits, such as sulfur containing compounds.

Figure 7A:
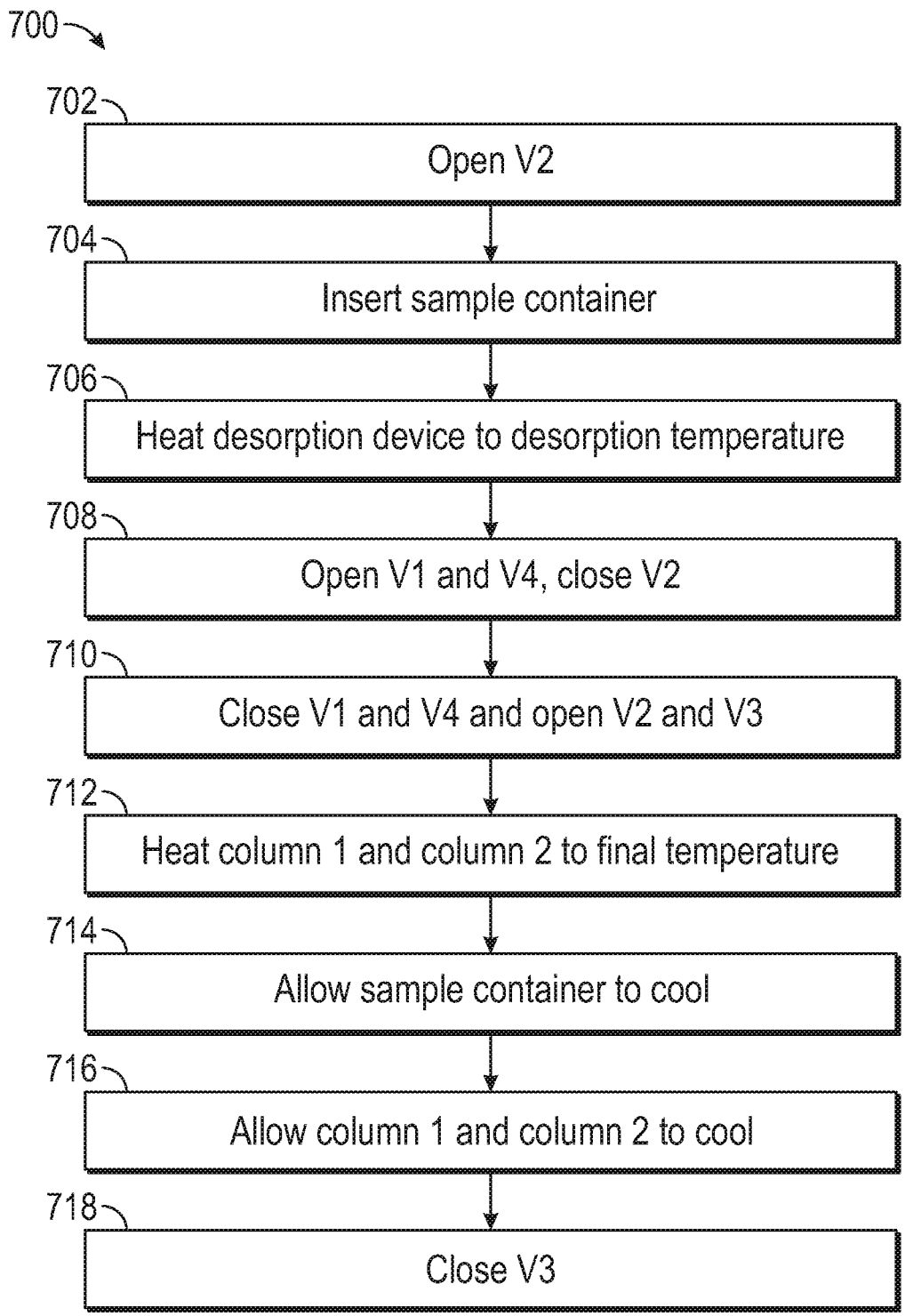

FIG. 7A illustrates an exemplary process 700 for performing chemical analysis according to some examples of the disclosure. In some examples, process 700 can be used in applications such as analyzing air samples collected using a diffusive sample container (e.g., a 3.5" thermal desorption tube) over the course of several days to a couple of weeks (e.g., two weeks) to detect BTEX and other organic compounds. For example, process 700 can be used to analyze samples collected using EPA method 325A/B. In some examples, one or more compounds of interest can have boiling points in the range of 40-140 degrees Celsius. The one or more compounds of interest can be airborne organic compounds, for example. In some examples, the concentration of one or more compounds of interest in the sample in the range of 0.5 to 30 parts per billion.

Process 700 can be performed using a chemical analysis system such as configuration 100 or chemical analysis system 300. As an example, when performing process 700, the first column 332 can be a thin film precolumn with an inner diameter in the range of 0.009 to 0.021 inches (0.25 to 0.53 mm) and a length on the order of 5 meters and the second column 334 can have a length in the range of 15 to 30 meters and an inner diameter in the range of 0.007 to 0.013 inches (0.18 to 0.32 mm). Other column types and dimensions are possible. In some examples, one or more processors (e.g., controllers, microprocessors, computers, computer systems, etc.) running software and/or instructions stored on a non-transitory computer-readable medium for performing, initiating, controlling, or assisting in any of the steps in process 700.

While the desorption device 320 and the thermal chamber 330 are at a starting temperature, bypass valve V2 344 can be opened (step 702 of process 700). In some examples, the starting temperature of the desorption device 320 can be in the range of 30 to 70 degrees Celsius and the starting temperature of the thermal chamber can be in the range of 30 to 50 degrees Celsius. Time can pass until the chemical analysis system 300 is ready to start the next analysis. In some examples, chemical analysis system 300 includes a GC or GC-MS that transmits a READY signal when it is ready to start the next analysis.

The sample container 310 can be inserted into the desorption device 320 (step 704 of process 700). In some examples, inserting the sample container 310 includes removing a sample container used in a previous analysis or a "blank" sample container. "Blank" sample containers do not include sorbent or sample but can be used in place of the previously-used sample container to close off the system 300 when a sample is not loaded.

The desorption device 320 can be heated to a desorption temperature (e.g., 80 to 400 or 200 to 300 degrees Celsius) using, for example, heater 326 (step 706 of process 700). Heating the desorption device 320 can take an amount of time on the order of thirty seconds, for example. In some examples, heating the desorption device 320 can also heat a sample container 310 held within the desorption device. During this time, the first column 332 can remain at the starting temperature, causing compounds that expand within the sample container 310 to re-condense when they reach the first column. In some examples, the volume of the first column 332 can accommodate expansion of the sample, preventing pre-loading or early transfer of compounds from the first column to the second column 334.

After preheating the desorption device 320 to the desorption temperature with no flow through the sample container 320 or the first column 332, the desorption valve V1 342 and the second split valve V4 348 can be opened and the bypass valve V2 344 can be closed (step 708 of process 700). During this time, the first split valve V3 346 can remain closed. A carrier fluid 336 can flow through desorption valve V1 342, through the first column 332, and then flow can split between the second split valve V4 348 and the second column 334 at a split ratio in the range of 20:1 to 30:1 or as much as 50:1 with most of the flow going out through the second split valve V4. to flow through the sample container 310 to the first column 332, from the first column 332 to the second column 334, and from the second column 334 into the detector 360.

After a two to five-minute desorption time, and a time needed to transfer all compounds of interest through the first column 332 with a fraction of the flow diverted to the second column, the desorption valve V1 342 and the second split valve V4 348 can be closed and the bypass valve V2 344 and the first split valve V3 346 can be opened (step 710 of process 700). During this time, flow can continue through the second column 334 while the first column 332 is backflushed. One or more compounds contained in the second column 334 can elute into the detector while compounds contained in the first column 332 are prevented from entering the second column 334. In this way, lighter compounds of interest can be detected while heavier compounds not of interest can be backflushed and/or baked out of the chemical analysis system 300. Separating the sample compounds in this way can prevent the heavier compounds from contaminating the second column 334.

The first column 332 and the second column 334 can be heated over time to a final temperature (e.g., 80 to 400 or 200 to 300 degrees Celsius) using, for example, thermal chamber 330 (step 712 of process 700). In some examples, the thermal chamber 330 can be heated gradually at a rate around 6 degrees Celsius per minute. Heating the first column 332 and the second column 334 in this way can allow one or more compounds within the first column to be backflushed to the first split valve V3 346 and one or more compounds within the second column to elute towards the detector 360 as the temperature increases. Elution of the sample into the detector 360 can be allowed to occur for an amount of time in the range of 5 to 60 minutes.

Desorption device 320 can be allowed to cool (e.g., heater 326 can be powered off or deactivated) to the starting temperature (step 714 of process 700). In some examples, cooling the desorption device 320 can also cool a sample container 310 held within the desorption device. During this time, one or more compounds of interest can elute from the second column 334 to the detector 360 and one or more compounds not of interest (e.g., one or more heavier compounds with lower boiling points) that remain on the first column 332 can be backflushed through the first split valve V3 346 to exit the chemical analysis system 300 without reaching the second column 334 or the detector 360.

The first column 332 and the second column 334 can be allowed to cool (e.g., thermal chamber 330 can be deactivated and/or one or more vents of the thermal chamber can be opened) to their starting temperature (step 716 of process 700). By cooling the system 300, it can start the next run at starting temperature (e.g., 30 to 50 degrees Celsius), as described previously.

The first split valve V3 346 can be closed (step 718 of process 700).

FIG. 7B illustrates an exemplary table 720 indicating the status of the valves 342-348, heater 326, and thermal chamber 330 during chemical analysis process 700 according to examples of the disclosure. Process 700 can include preheating 730 (e.g., preheating 402), desorption and sample preparation 740 (e.g., desorption and sample preparation 404), and analysis and cleanup 750 (e.g., analysis and cleanup 406). The operation of V1 721 (e.g., desorption valve V1 342), V2 722 (e.g., bypass valve V2 344), V3 723 (e.g., first split valve V3 346), and V4 724 (e.g., second split valve V4 348), the desorption device (e.g., desorption device 320) temperature 725 (e.g., controlled by heater 326), and columns 1 and 2 (e.g., first column 332 and second column 334) temperature 726 (e.g., controlled by thermal chamber 330) during preheating 730, desorption and sample preparation 740, and analysis and cleanup 750 of process 700 will now be described.

Preheating 730 can include steps 702-706 of process 700. In some examples, during preheating 730, V1 721 can be closed 731, V2 722 can be open 732, V3 723 can be closed 733, and V4 724 can be closed 734. The desorption device temperature 725 can be heated to the desorption temperature 735 (e.g., 200 to 300 degrees Celsius) and columns 1 and 2 temperature 726 can be a starting temperature 736 (e.g., 30 to 50 degrees Celsius), for example.

Desorption and sample preparation 740 can include step 708 of process 700. In some examples, during desorption and sample preparation 740, V1 721 can be open 741, V2 722 can be closed 742, V3 723 can be closed 743, and V4 724 can be open 744. The desorption device temperature 725 can remain at the desorption temperature 745 (e.g., 80 to 400 or 200 to 300 degrees Celsius) and columns 1 and 2 temperature 726 can remain at their starting temperature (e.g., 30 to 50 degrees Celsius) for example.

Analysis and cleanup 750 can include steps 710-712 of process 700. In some examples, during analysis and cleanup 750, V1 721 can be open 751, V2 722 can be open 752, V3 723 can be open 753, and V4 724 can be closed 754. The desorption device temperature 725 can remain at the desorption temperature (e.g., 80 to 400 or 300 to 400 degrees Celsius) and columns 1 and 2 temperature 726 can gradually be heated (e.g., at a rate of about 6 degrees Celsius per minute) to their final temperature 746 (e.g., 200 to 300 degrees Celsius), for example. In this way, one or more compounds remaining on the first column 332 can be backflushed out through the first split valve V3 346. In some examples, after the first column 332 and sample container 310 are backflushed during cleanup 750, steps 714 and 718 of process 700 can be performed.

Accordingly, process 700 can be used to analyze air samples collected using EPA method 325A/B to detect Benzene (e.g., collected around petroleum refineries). In some examples, such analysis can be used to confirm that Benzene levels are at or below 9 micrograms per cubic meter. In some examples, the sample can be collected using 3.5" thermal desorption tubes. During collection of Benzene, in some examples, other heavier compounds can also be collected. Process 700 can be used to analyze Benzene levels without allowing the heavier compounds to contaminate the flow path of chemical analysis system 300 (e.g., by preventing these compounds from entering the second column 334 and by replacing the desorption device liner 322 and/or the first column 332 as needed). Opening the bypass valve V2 334 once one or more target compounds have transferred to the second column 334 can allow those compounds to be detected at detector 360 while preventing one or more heavy compounds not of interest contained in the first column 332 to be backflushed out of the system. In this way, the heavy compounds are not able to contaminate the second column 334, thereby reducing runtimes and simplifying cleanup. When maintenance of the system 300 is needed, the first column 332, the desorption device liner 322, and the sample container 310 can be replaced, providing a new flow path for the next sample. Such maintenance can be simpler than cleaning and repairing rotary valves, rotors, transfer lines, and electronics used in external trapping devices.

Figure 8A:
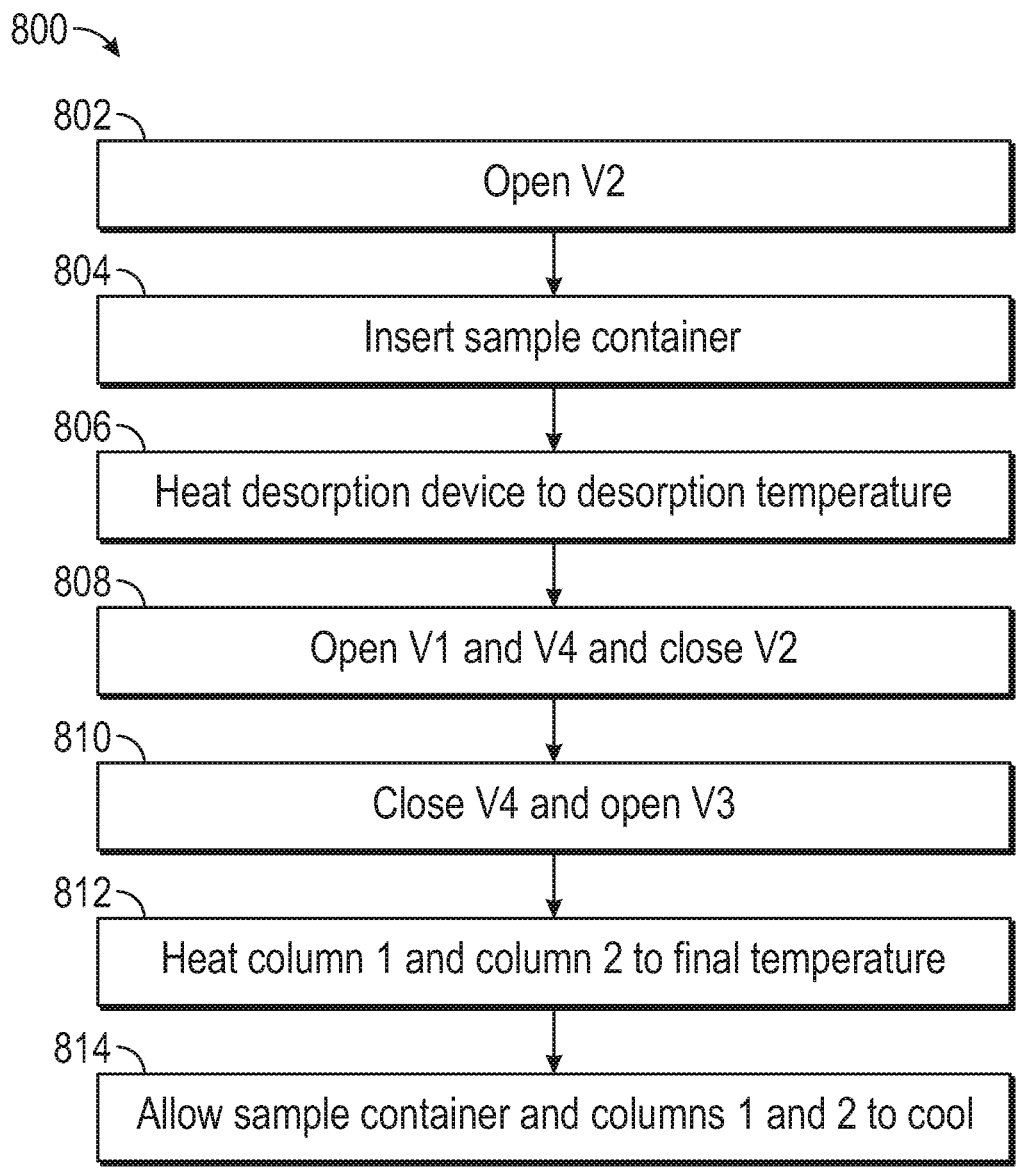

FIG. 8A illustrates an exemplary process 800 for performing chemical analysis according to some examples of the disclosure. In some examples, process 800 can be used in applications such as analyzing indoor or outdoor air samples collected using a diffusive sample container over time periods in the range of 1-8 hours or 24 hours to one month to detect airborne organic compounds. In some examples, one or more compounds of interest can have boiling points in the range of 120-500 degrees Celsius. In some examples, the concentration of one or more compounds of interest in the sample in the range of 0.01 to 30 parts per billion.

Process 800 can be performed using a chemical analysis system such as configuration 100 or chemical analysis system 300. As an example, when performing process 800, the first column 332 can be a thin film precolumn with an inner diameter in the range of 0.009 to 0.021 inches (0.25 to 0.53 mm) and a length on the order of 5 meters and the second column 334 can have a length in the range of 15 to 60 meters and an inner diameter in the range of 0.007 to 0.013 inches (0.18 to 0.32 mm). The first column 332 can have a film to absorb the sample that is somewhat thinner or weaker than a film on the second column 334. This arrangement allows retention of the sample during desorption on the first column 332 while allowing a further "refocusing" of the sample as it passes from the less retentive first column 332 to the stronger more retentive second column 334. In some examples, one or more processors (e.g., controllers (e.g., controller 350), microprocessors, computers, computer systems, etc.) running software and/or instructions stored on a non-transitory computer-readable medium for performing, initiating, controlling, or assisting in any of the steps in process 800.

While the desorption device 320 and the thermal chamber 330 are at their starting temperatures, bypass valve V2 344 can be opened (step 802 of process 800). In some examples, the starting temperature of the desorption device 320 can be in the range of 30 to 70 degrees Celsius and the starting temperature of the thermal chamber 330 can be in the range of 30 to 50 degrees Celsius. Time can pass until the chemical analysis system 300 is ready to start the next analysis. In some examples, chemical analysis system 300 includes a GC or GC-MS that transmits a READY signal when it is ready to start the next analysis.

The sample container 310 can be inserted into the desorption device 320 (step 804 of process 800). In some examples, inserting the sample container 310 includes removing a sample container used in a previous analysis or a "blank" sample container. "Blank" sample containers do not include sorbent or sample but can be used in place of the previously-used sample container to close off the system 300 when a sample is not loaded.

The desorption device 320 can be heated to a desorption temperature (e.g., 200 to 300 degrees Celsius) using, for example, heater 326 (step 806 of process 800). Heating the desorption device 320 can take an amount of time up to one minute, for example. During this time, the first column 332 can remain at the starting temperature, causing compounds that expand within the sample container 310 to re-condense when they reach the first column. In some examples, heating the desorption device 320 in this way can also heat a sample container 310 held by the desorption device 320.

The desorption valve V1 342 and the second split valve V4 348 can be opened and the bypass valve V2 344 can be closed (step 808 of process 800). This step can occur when the sample (e.g., the desorption device 320 and/or sample container 310) reaches a preheat temperature below or up to as high as the final desorption temperature. At this time, one or more compounds in the sample can flow from the sample container 310 to the first column 332.

After a two to six minute desorption of the heavy compounds in the sample onto the first column 332, the second split valve V4 348 can be turned off and the first split valve V3 346 can be turned on to effectively bake most of the remaining sample residue out through the first split valve V3 (step 810 of process 800). At this time, any sample compounds contained in the first column 332 can transfer to the second column 334.

The first column 332 and the second column 334 can be gradually heated to a final temperature (e.g., 80 to 400 or 200 to 300 degrees Celsius) using, for example, thermal chamber 330 (step 812 of process 800). In some examples, the thermal chamber 330 can be heated gradually at a rate around 6 degrees Celsius per minute. Heating the first column 332 and the second column 334 in this way can allow one or more compounds within the first and second columns to elute through the first column and second column towards the detector 360. In some examples, the second column 334 can have a thicker film layer than the first column 332 does, which can provide better peak shape and chromatographic resolution. Transfer of the sample into the detector 360 can be allowed to occur for an amount of time in the range of 5 to 60 minutes.

Desorption device 320, first column 332, and second column 334 can be allowed to cool (e.g., heater 326 and thermal chamber 330 can be powered off or deactivated) to the starting temperatures (step 814 of process 800). By cooling the system 300, it can start the next run at its starting temperature (e.g., 30 to 50 degrees Celsius for thermal chamber 330 and 30 to 70 degrees Celsius for the sample container 310), as described previously.

FIG. 8B illustrates an exemplary table 820 indicating the status of the valves 342-348, heater 326, and thermal chamber 330 during chemical analysis process 800 according to examples of the disclosure. Process 800 can include preheating 830 (e.g., preheating 402), desorption and sample preparation 840 (e.g., desorption and sample preparation 404), and analysis and cleanup 850 (e.g., analysis and cleanup 406). The operation of V1 821 (e.g., desorption valve V1 342), V2 822 (e.g., bypass valve V2 344), V3 823 (e.g., first split valve V3 346), and V4 824 (e.g., second split valve V4 348), the desorption device (e.g., desorption device 310) temperature 825 (e.g., controlled by heater 326), and columns 1 and 2 (e.g., first column 332 and second column 334) temperature 826 (e.g., controlled by thermal chamber 330) during preheating 830, desorption and sample preparation 840, and analysis and cleanup 850 of process 800 will now be described.

Preheating 830 can include steps 802-806 of process 800. In some examples, during preheating 830, V1 821 can be closed 831, V2 822 can be open 832, V3 823 can be closed 833, and V4 824 can be closed 834. The desorption device temperature 825 can be heated to the desorption temperature 835 (e.g., 200 to 300 degrees Celsius) and columns 1 and 2 temperature 826 can be a starting temperature 836 (e.g., 30 to 50 degrees Celsius), for example.

Desorption and sample preparation 840 can include step 808 of process 800. In some examples, during desorption and sample preparation 840, V1 821 can be open 841, V2 822 can be closed 842, V3 823 can be closed 843, and V4 824 can be open 844. The desorption device temperature 825 can remain at the desorption temperature 845 (e.g., 200 to 300 degrees Celsius) and columns 1 and 2 temperature 826 can be at the starting temperature, for example.

Analysis and cleanup 850 can include steps 810-812 of process 800. In some examples, during analysis and cleanup 850, V1 821 can be open 851, V2 822 can be closed 852, V3 823 can be open 853, and V4 824 can be closed 854. The desorption device temperature 825 can remain at the desorption temperature 855 (e.g., 200 to 300 degrees Celsius) and columns 1 and 2 temperature 826 can be heated gradually to a final temperature 846 (e.g., 80 to 400 or 200 to 300 degrees Celsius), for example. In some examples, after the sample is baked out during cleanup 850, step 814 of process 800 can be performed. During this time, the detector 360 can perform chemical analysis on the sample.

Accordingly, process 800 can be used to detect a wide range of compounds in ambient and indoor air. The air samples can be collected by placing diffusive tubes in the area (e.g., a field or an indoor environment) having the air that is to be analyzed for a period of 1 to 30 days to obtain a high sensitivity time weighted average of airborne concentrations during the monitoring period. During desorption and sample preparation 840, one or more relatively heavy compounds of interest can be collected by the first column 332, while one or more lighter compounds, water vapor, and carrier fluid can be substantially removed through the second split valve V4 348. After desorption and sample preparation, when the second split valve V4 348 is closed, the compounds (e.g., 100% of the target compounds) that remained trapped on the first column 332 can elute into the second column 334 and into the detector 360. In this way, the detection limit for these compounds can be increased or maximized.

In some examples, any of the systems described above with reference to FIGS. 1-8B can include one or more processors (e.g., controllers, microprocessors, computers, computer systems, etc.) running software and/or instructions stored on a non-transitory computer-readable medium for performing, initiating, controlling, or assisting in any of the steps in any of the processes or methods described above with reference to FIGS. 1-8B. In some examples, each software process can be executed on a different processor in a computing cluster or mainframe. Alternatively or in addition, some examples may implement one or more processors and/or computer-controlled processes as hardware, firmware, software, or a combination thereof.

Therefore, according to the above, some examples of the disclosure are related to a chemical analysis system, comprising: a first column fluidly coupled to a second column at a junction; a detector fluidly coupled to the second column, the detector configured to perform chemical analysis; a desorption device configured to fluidly couple a sample container that includes a sample to the first column; a first heater thermally coupled to the desorption device; a plurality of valves including a bypass valve configured to selectively divert a carrier fluid at the junction; and one or more controllers configured to heat, using the first heater, the desorption device to a desorption temperature while the first column is at a starting temperature during a first time period. Additionally or alternatively, in some examples, the controller is further configured to open the bypass valve during the first time period, thereby preventing flow of the carrier fluid and the sample through the desorption device and the first column. Additionally or alternatively, in some examples, preventing flow of the carrier fluid and the sample through the desorption device and the first column allows expansion without pre-delivery to the second column, water included in the sample condenses at the first column during the first time period, the one or more controllers are further configured to: during a second time after the first time: open a second split valve configured to fluidly couple and decouple the junction to a sample vent though a flow control device; and establish a desorption flow having a pressure level within a first threshold of a predetermined pressure level and a flow rate within a second threshold of a predetermined flow rate, with a delay before reaching the junction, thereby improving a split ratio reproducibility between the second column and the second split valve. Additionally or alternatively, in some examples, the chemical analysis system includes a second heater thermally coupled to the first column and the second column, wherein the controller is further configured to heat, using the second heater, the first column and the second column to a final temperature during a second time period after the first time period to facilitate elution of sample previously delivered to the first column. Additionally or alternatively, in some examples, the final temperature of the first column and the second column is in the range of 200 to 300 degrees Celsius; and the second heater heats the first column and the second column to the final temperature at a rate on the order of 6 degrees Celsius per minute. Additionally or alternatively, in some examples, the desorption temperature of the desorption device is in the range of 80 to 400 degrees Celsius and the starting temperature of the first column and the second column is in the range of 30 to 50 degrees Celsius. Additionally or alternatively, in some examples, the chemical analysis system further includes a desorption valve configured to selectively divert the carrier fluid from a desorption end of the sample container opposite a delivery end of the sample container, the delivery end of the sample container coupled to the first column; a first split valve configured to fluidly couple and decouple the sample container to a first sample vent through a flow control device; and a second split valve configured to fluidly couple and decouple the junction to a second sample vent through the flow control device. Additionally or alternatively, in some examples, the chemical analysis system further includes a second heater thermally coupled to the first column and the second column, wherein the one or more controllers are further configured to: during a preheating stage including the first time period: open the bypass valve and the second split valve; and close the desorption valve and the first split valve; during a desorption and sample preparation stage after the preheating stage: open the desorption valve and the second split valve; and close the bypass valve and the first split valve; and during an analysis and cleanup stage after the desorption and sample preparation stage: begin to heat, using the second heater, the first column and the second column to a final temperature; and open the desorption valve, the bypass valve, and the first split valve. Additionally or alternatively, in some examples, the chemical analysis system further includes a second heater thermally coupled to the first column and the second column, wherein the one or more controllers are further configured to: during a desorption and sample preparation stage including the first time period: open the desorption valve and the second split valve; and close the bypass valve and the first split valve; and during an analysis and cleanup stage after the desorption and sample preparation stage: open the desorption valve, the bypass valve and the first split valve; close the second split valve; and begin to heat, using the second heater, the first column and the second column to a final temperature. Additionally or alternatively, in some examples, the chemical analysis system further includes a second heater thermally coupled to the first column and the second column, wherein the one or more controllers are further configured to: during a preheating stage including the first time period: open the bypass valve; and close the desorption valve, the first split valve, and the second split valve; during a desorption and sample preparation stage after the preheating stage: open the desorption valve and the second split valve; and close the bypass valve and the first split valve; during an analysis and cleanup stage after the desorption and sample preparation stage: heat, using the second heater, the first column and the second column to a final temperature; open the bypass valve and the first split valve; and close the desorption valve and the second split valve. Additionally or alternatively, in some examples, the chemical analysis system further includes a second heater thermally coupled to the first column and the second column, wherein the one or more controllers are further configured to: during a preheating stage including the first time period: open the bypass valve; and close the desorption valve, the first split valve, and the second split valve; during a desorption and sample preparation stage after the preheating stage: open the desorption valve and the second split valve; and close the bypass valve and the first split valve; and during an analysis and cleanup stage after the desorption and sample preparation stage: open the desorption valve and the first split valve; and close the bypass valve and the second split valve. Additionally or alternatively, in some examples, during a preheating stage including the first time period: a volume of the first column accommodates expansion of the sample; sample does not transfer from the first column to the second column; and water and one or more unwanted matrix compounds included in the sample condense at the first column; during a desorption and sample preparation stage after the preheating stage: the volume of the first column allows a delay in delivery of the sample to the junction; after the delay, a flow rate through the junction stabilizes and is within a threshold of a predetermined flow rate and a pressure at the junction is within a threshold of a predetermined pressure to improve the reproducibility of the split flow ratios between the second column and the second split valve; and at least a first portion of the water and one or more unwanted matrix compounds included in the sample exit the chemical analysis system through a second split port coupled to the junction; during an analysis and cleanup stage after the desorption and sample preparation stage: the first column is backflushed, thereby removing a second portion of the water and one or more unwanted matrix compounds included in the sample from the chemical analysis system through a first split port coupled to an inlet end of the first column, the inlet end at an end opposite of and end of the first column coupled to the junction.

Some examples of the disclosure are related to a method of performing a chemical analysis process, the method comprising: providing a sample in a sample container; fluidly coupling the sample container to a first column via a desorption device, the first column fluidly coupled to a second column at a junction; during a preheating stage of a chemical analysis process: heating, using a first heater, the desorption device to a desorption temperature while the first column and second column are at a starting temperature; and bypassing, with a bypass valve configured to fluidly couple the junction to a carrier fluid, the sample container and the first column, thereby preventing flow of the carrier fluid and the sample through the desorption device and the first column; and analyzing the sample using a detector. Additionally or alternatively, in some examples, the method further includes, during an analysis and cleanup stage after the preheating stage: heating, using a second heater thermally coupled to the first column and the second column, the first column and the second column to a final temperature to facilitate elution of sample previously delivered to the first column. Additionally or alternatively, in some examples, the final temperature of the first column and the second column is in the range of 200 to 300 degrees Celsius. Additionally or alternatively, in some examples, the desorption temperature of the sample container is in the range of 80 to 400 degrees Celsius and the starting temperature of the first column and the second column is in the range of 30 to 50 degrees Celsius. Additionally or alternatively in some examples during the preheating stage of the chemical analysis process, there is no flow through the desorption device and the first column Some examples of the disclosure are related to a non-transitory computer-readable medium storing instructions that, when executed by one or more processors operatively coupled to a chemical analysis device, cause the processors to perform a method comprising: fluidly coupling a sample container including a sample to a first column via a desorption device, the first column fluidly coupled to a second column at a junction; during a preheating stage of a chemical analysis process: heating, using a first heater, the desorption device to a desorption temperature while the first column and second column are at a starting temperature; and bypassing, with a bypass valve configured to fluidly couple the junction to a carrier fluid, the sample container and the first column, thereby preventing flow of the carrier fluid and the sample through the desorption device and the first column; and analyzing the composition of the sample using a detector. Additionally or alternatively, in some examples, the method further comprises: during an analysis and cleanup stage after the preheating stage: heating, using a second heater thermally coupled to the first column and the second column, the first column and the second column to a final temperature to facilitate elution of sample previously delivered to the first column. Additionally or alternatively, in some examples, the final temperature of the first column and the second column is in the range of 200 to 300 degrees Celsius. Additionally or alternatively, in some examples, the desorption temperature of the desorption device is in the range of 80 to 400 degrees Celsius and the starting temperature of the first column and the second column is in the range of 30 to 50 degrees Celsius. Additionally or alternatively in some examples during the preheating stage of the chemical analysis process, there is no flow through the desorption device and the first column Although examples have been fully described with reference to the accompanying drawings, it is to be noted that various changes and modifications will become apparent to those skilled in the art. Such changes and modifications are to be understood as being included within the scope of examples of this disclosure as defined by the appended claims.

What is claimed is:

1. A chemical analysis system, comprising:
a first column fluidly coupled to a second column at a junction;
a detector fluidly coupled to the second column, the detector configured to perform chemical analysis;
a desorption device configured to fluidly couple a sample container that includes a sample to the first column;
a first heater thermally coupled to the desorption device;
a plurality of valves including:
a bypass valve configured to selectively divert a carrier fluid from a carrier fluid supply at the junction;
a desorption valve configured to selectively divert the carrier fluid from a carrier fluid supply to a desorption end of the sample container opposite a delivery end of the sample container, the delivery end of the sample container coupled to the first column;
a first split valve configured to fluidly couple and decouple the sample container to a flow control device; and
a second split valve configured to fluidly coupled and decouple the junction to the flow control device; and
one or more controllers configured to heat, using the first heater, the desorption device to a desorption temperature while the first column is at a starting temperature during a first time period.

2. The chemical analysis system of claim 1, wherein the one or more controllers are further configured to open the bypass valve during the first time period, thereby preventing flow of the carrier fluid with the sample through the desorption device and the first column.

3. The chemical analysis system of claim 2, wherein:
preventing flow of the carrier fluid and the sample through the desorption device and the first column allows expansion without pre-delivery to the second column, water included in the sample condenses at the first column during the first time period,
the one or more controllers are further configured to:
during a second time after the first time:
open a second split valve configured to fluidly couple and decouple the junction to a flow control device; and establish a desorption flow having a pressure level within a first threshold of a predetermined pressure level and a flow rate within a second threshold of a predetermined flow rate, with a delay before reaching the junction, thereby improving a split ratio reproducibility between the second column and the second split valve.

4. The chemical analysis system of claim 1, further comprising a second heater thermally coupled to the first column and the second column, wherein the controller is further configured to heat, using the second heater, the first column and the second column to a final temperature during a second time period after the first time period to facilitate elution of sample previously delivered to the first column.

5. The chemical analysis system of claim 4, wherein:
the final temperature of the first column and the second column is in the range of 200 to 300 degrees Celsius; and
the second heater heats the first column and the second column to the final temperature at a rate on the order of 6 degrees Celsius per minute.

6. The chemical analysis system of claim 1, wherein the desorption temperature of the desorption device is in the range of 80 to 400 degrees Celsius and the starting temperature of the first column and the second column is in the range of 30 to 50 degrees Celsius.

7. The chemical analysis system of claim 1, further comprising a second heater thermally coupled to the first column and the second column, wherein the one or more controllers are further configured to:
during a preheating stage including the first time period:
preheating the desorption device using the first heater;
open the bypass valve and the second split valve; and
close the desorption valve and the first split valve;
during a desorption and sample preparation stage after the preheating stage:
open the desorption valve and the second split valve; and
close the bypass valve and the first split valve; and
during an analysis and cleanup stage after the desorption and sample preparation stage:
begin to heat, using the second heater, the first column and the second column to a final temperature; and
open the desorption valve, the bypass valve, and the first split valve.

8. The chemical analysis system of claim 1, further comprising a second heater thermally coupled to the first column and the second column, wherein the one or more controllers are further configured to:
during a desorption and sample preparation stage including the first time period:
open the desorption valve and the second split valve; and
close the bypass valve and the first split valve; and
during an analysis and cleanup stage after the desorption and sample preparation stage:
open the desorption valve, the bypass valve and the first split valve;
close the second split valve; and
begin to heat, using the second heater, the first column and the second column to a final temperature.

9. The chemical analysis system of claim 1, further comprising a second heater thermally coupled to the first column and the second column, wherein the one or more controllers are further configured to:

during a preheating stage including the first time period:
preheating the desorption device using the first heater;
open the bypass valve; and
close the desorption valve, the first split valve, and the second split valve;
during a desorption and sample preparation stage after the preheating stage:
open the desorption valve and the second split valve; and
close the bypass valve and the first split valve;
during an analysis and cleanup stage after the desorption and sample preparation stage:
heat, using the second heater, the first column and the second column to a final temperature;
open the bypass valve and the first split valve; and
close the desorption valve and the second split valve.

10. The chemical analysis system of claim 1, further comprising a second heater thermally coupled to the first column and the second column, wherein the one or more controllers are further configured to:
during a preheating stage including the first time period:
preheating the desorption device using the first heater;
open the bypass valve; and
close the desorption valve, the first split valve, and the second split valve;
during a desorption and sample preparation stage after the preheating stage:
open the desorption valve and the second split valve; and
close the bypass valve and the first split valve; and
during an analysis and cleanup stage after the desorption and sample preparation stage:
open the desorption valve and the first split valve; and
close the bypass valve and the second split valve.

11. The chemical analysis system of claim 1, wherein:
during a preheating stage including the first time period:
a volume of the first column accommodates expansion of the sample;
sample does not transfer from the first column to the second column; and
water and one or more unwanted matrix compounds included in the sample condense at the first column;
during a desorption and sample preparation stage after the preheating stage:
the volume of the first column allows a delay in delivery of the sample to the junction;
after the delay, a flow rate through the junction stabilizes and is within a threshold of a predetermined flow rate and a pressure at the junction is within a threshold of a predetermined pressure to improve the reproducibility of the split flow ratios between the second column and the second split valve; and
at least a first portion of the water and one or more unwanted matrix compounds included in the sample exit the chemical analysis system through a second split port coupled to the junction;
during an analysis and cleanup stage after the desorption and sample preparation stage:
the first column is backflushed, thereby removing a second portion of the water and one or more unwanted matrix compounds included in the sample from the chemical analysis system through a first split port coupled to an inlet end of the first column, the inlet end at an end opposite of and end of the first column coupled to the junction.

12. A method of performing a chemical analysis process, the method comprising:
providing a sample in a sample container;
fluidly coupling the sample container to a first column via a desorption device, the first column fluidly coupled to a second column at a junction;
during a preheating stage of a chemical analysis process:
heating, using a first heater, the desorption device to a desorption temperature while the first column and second column are at a starting temperature; and
bypassing, with a bypass valve configured to fluidly couple the junction to a carrier fluid, the sample container and the first column, thereby preventing flow of the carrier fluid and the sample through the desorption device and the first column; and
during a desorption stage of the chemical analysis process:
selectively diverting the carrier fluid from a carrier fluid supply to a desorption end of the sample container opposite a delivery end of the sample container, the delivery end of the sample container coupled to the first column, using a desorption valve; and
coupling, via a first split valve, the junction to a flow control device;
during an analysis stage of the chemical analysis process:
coupling, using a second split valve, the sample container to the flow control device; and
analyzing the sample using a detector.

13. The method of claim 12, further comprising:
during the analysis stage and during a cleanup stage after the preheating stage:
heating, using a second heater thermally coupled to the first column and the second column, the first column and the second column to a final temperature to facilitate elution of sample previously delivered to the first column.

14. The method of claim 13, wherein the final temperature of the first column and the second column is in the range of 200 to 300 degrees Celsius.

15. The method of claim 12, wherein the desorption temperature of the sample container is in the range of 80 to 400 degrees Celsius and the starting temperature of the first column and the second column is in the range of 30 to 50 degrees Celsius.

16. The method of claim 12, wherein:
during the preheating stage of the chemical analysis process, there is no flow through the desorption device and the first column.

17. A non-transitory computer-readable medium storing instructions that, when executed by one or more processors operatively coupled to a chemical analysis device, cause the processors to perform a method comprising:
fluidly coupling a sample container including a sample to a first column via a desorption device, the first column fluidly coupled to a second column at a junction;
during a preheating stage of a chemical analysis process:
heating, using a first heater, the desorption device to a desorption temperature while the first column and second column are at a starting temperature; and
bypassing, with a bypass valve configured to fluidly couple the junction to a carrier fluid, the sample container and the first column, thereby preventing flow of the carrier fluid and the sample through the desorption device and the first column; and
during a desorption stage of the chemical analysis process:
selectively diverting the carrier fluid from a carrier fluid supply to a desorption end of the sample container opposite a delivery end of the sample container, the delivery end of the sample container coupled to the first column, using a desorption valve; and
coupling, via a first split valve, the junction to a flow control device;
during an analysis stage of the chemical analysis process:
coupling, using a second split valve, the sample container to the flow control device; and
analyzing the composition of the sample using a detector.

18. The computer-readable medium of claim 17, wherein the method further comprises:
during the analysis stage and during a cleanup stage after the preheating stage:
heating, using a second heater thermally coupled to the first column and the second column, the first column and the second column to a final temperature to facilitate elution of sample previously delivered to the first column.

19. The computer-readable medium of claim 17, wherein:
during the preheating stage of the chemical analysis process, there is no flow through the desorption device and the first column.

* * * * *